US010066845B2

(12) United States Patent
Lee et al.

(10) Patent No.: US 10,066,845 B2
(45) Date of Patent: Sep. 4, 2018

(54) HUMIDIFICATION AND AIR CLEANING APPARATUS

(71) Applicant: LG ELECTRONICS INC., Seoul (KR)

(72) Inventors: Kunyoung Lee, Seoul (KR); Taeyoon Kim, Seoul (KR); Jongsu Lee, Seoul (KR); Jungwoo Lee, Seoul (KR); Younggu Lee, Seoul (KR); Jieun Choi, Seoul (KR); Hyuckju Kwon, Seoul (KR); Sanghyuk Son, Seoul (KR); Kyoungho Lee, Seoul (KR); Unchang Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/337,451

(22) Filed: Oct. 28, 2016

(65) Prior Publication Data

US 2017/0122583 A1 May 4, 2017

Related U.S. Application Data

(60) Provisional application No. 62/355,118, filed on Jun. 27, 2016, provisional application No. 62/248,463, filed on Oct. 30, 2015.

(30) Foreign Application Priority Data

Nov. 7, 2015 (KR) .......... 10-2015-0156254
Dec. 24, 2015 (KR) .......... 10-2015-0185857
(Continued)

(51) Int. Cl.
*B01F 3/04* (2006.01)
*F24F 6/00* (2006.01)
(Continued)

(52) U.S. Cl.
CPC .......... *F24F 6/04* (2013.01); *B01D 46/10* (2013.01); *B01F 3/04035* (2013.01);
(Continued)

(58) Field of Classification Search
CPC ...... F24F 6/04; B01F 3/04035; B01F 3/04042
(Continued)

(56) References Cited

U.S. PATENT DOCUMENTS 4,749,389 A 6/1988 Wörwag
5,514,303 A * 5/1996 Chiu .............. B05B 3/085
261/91

FOREIGN PATENT DOCUMENTS

JP 11-347095 A 12/1999
JP 2003-307327 A 10/2003
(Continued)

*Primary Examiner* — Robert A Hopkins
(74) *Attorney, Agent, or Firm* — Dentons US LLP

(57) ABSTRACT

Provided is a humidification and air cleaning apparatus. The humidification and air cleaning apparatus includes a base body including an upper body and a lower body coupled to a lower part of the upper body, a water tank disposed at an upper part of the upper body, storing water, and including a water housing spraying water to the inside, a watering motor installed at the upper body and providing a torque to the watering housing; and a blower motor installed at the lower body. Here, the lower body, the upper body, and the water tank are stacked sequentially. The blower motor, and the watering motor are disposed vertically inside the base body. The watering motor, and the blower motor are spaced a predetermined interval away from each other and disposed on the same axis.

19 Claims, 24 Drawing Sheets

(30) Foreign Application Priority Data

| | | | |
|---|---|---|---|
| Jun. 30, 2016 | (KR) | ........................ | 10-2016-0083053 |
| Sep. 23, 2016 | (KR) | ........................ | 10-2016-0122169 |
| Sep. 23, 2016 | (KR) | ........................ | 10-2016-0122170 |
| Sep. 23, 2016 | (KR) | ........................ | 10-2016-0122171 |
| Oct. 6, 2016 | (KR) | ........................ | 10-2016-0129314 |

(51) Int. Cl.

| | |
|---|---|
| *F24F 6/04* | (2006.01) |
| *B01D 46/10* | (2006.01) |
| *F24F 13/28* | (2006.01) |
| *F24F 13/20* | (2006.01) |

(52) U.S. Cl.
CPC .......... *B01F 3/04042* (2013.01); *F24F 13/20* (2013.01); *F24F 13/28* (2013.01); *B01D 2279/50* (2013.01); *F24F 2006/008* (2013.01); *F24F 2006/046* (2013.01)

(58) Field of Classification Search
USPC .............................................. 261/83, 85, 88
See application file for complete search history.

(56) References Cited

FOREIGN PATENT DOCUMENTS

| | | |
|---|---|---|
| JP | 2005-274041 A | 10/2005 |
| JP | 2008-145035 A | 6/2008 |
| JP | 2014-156968 A | 8/2014 |
| JP | 2015-52399 A | 3/2015 |
| JP | 2015-075285 A | 4/2015 |
| JP | 2015-143582 A | 8/2015 |
| JP | 2015-143603 A | 8/2015 |
| KR | 10-2004-0078945 A | 9/2004 |
| KR | 10-2012-0076284 A | 7/2012 |

* cited by examiner

HUMIDIFICATION AND AIR CLEANING APPARATUS

CROSS-REFERENCE TO RELATED APPLICATIONS

This U.S. non-provisional patent application claims priority to and benefit of U.S. Provisional Application Nos. 62/248,463 filed Oct. 30, 2015, and 62/355,118 filed Jun. 27, 2016, Korean Patent Application Nos. 10-2015-0156254 filed Nov. 7, 2015, 10-2015-0185857 filed Dec. 24, 2015, 10-2016-0083053 filed Jun. 30, 2016, 10-2016-0129314 filed Oct. 6, 2016, 10-2016-0122169 filed Sep. 23, 2016, 10-2016-0122170 filed Sep. 23, 2016 and 10-2016-0122171 filed Sep. 23, 2016, all of which are hereby incorporated by reference in their entirety.

BACKGROUND OF THE INVENTION

The present invention disclosed herein relates to an apparatus for both humidification and air cleaning.

Air conditioning apparatuses include air conditioners that control the temperature of air, air cleaners that remove foreign substances from air to maintain air cleanliness, humidifiers that increase humidity in the air, and dehumidifiers that reduce humidity in the air.

Typical humidifiers are classified into a vibration type which atomizes water on a vibrating plate and discharges it into air and a natural evaporation type that evaporates water in a humidification filter.

The natural evaporation type of humidifier is classified into a disc type of humidifier which rotates a disc using a driving force and allows water to naturally evaporate from the surface of the disc in the air and a humidification filter type of humidifier which allows water to naturally evaporate from a wet humidification medium by flowing air.

In a typical humidifier, a portion of flowing air during the humidification process is filtered by a filter. However, since the main function of a typical humidifier is a humidification function, its air cleaning function is weak.

Also, since a typical humidifier has a structure in which the humidification process is performed by adding a filtration function, a typical humidifier cannot be operated only for air filtration.

Accordingly, even in a situation where humidity is high, a typical humidifier inevitably performs humidification even thought a user desires air cleaning.

SUMMARY OF THE INVENTION

The present invention provides a humidification and air cleaning apparatus which can separately operate a humidification function and an air cleaning function.

The present invention also provides a humidification and air cleaning apparatus in which two motor can be effectively installed.

The present invention also provides a humidification and air cleaning apparatus which can minimize vibration even though two motors are simultaneously operated.

The present invention also provides a humidification and air cleaning apparatus which can prevent occurrence of resonance even though two motors are simultaneously operated.

The present invention also provides a humidification and air cleaning apparatus which can minimize delivery of vibration generated in one motor to the other motor.

The objectives of the present invention are not limited to the above-mentioned objectives, and other objectives that are not mentioned will be clearly understood by persons skilled in the art from the following description.

Embodiments of the present invention provide humidification and air cleaning apparatuses including: a base body including an upper body and a lower body coupled to a lower part of the upper body; a water tank disposed at an upper part of the upper body, storing water, and including a water housing spraying water to the inside; a watering motor installed at the upper body and providing a torque to the watering housing; and a blower motor installed at the lower body, wherein the lower body, the upper body, and the water tank are stacked sequentially, and the blower motor, and the watering motor are disposed vertically inside the base body, and the watering motor, and the blower motor are spaced a predetermined interval away from each other and disposed on the same axis.

In some embodiments, the blower motor may include a blower motor axis and the watering motor may include a watering motor axis, and the blower motor axis and the watering motor axis are disposed vertically.

In some embodiments, the blower motor axis and the watering motor axis may be disposed on the same straight line.

In some embodiments, the blower motor axis may be disposed downwardly, and the watering motor axis may be disposed upwardly.

In some embodiments, the humidification and air cleaning apparatuses may further include: a water tank mounted on the upper body and storing water; and a watering housing disposed inside the water tank and spraying water stored in the water tank, wherein the watering motor may deliver a torque to the watering housing and rotate the watering housing.

In some embodiments, the humidification and air cleaning apparatuses may further include: a first coupling coupled to the watering motor axis; and a second coupling coupled to the first coupling to receive a torque and coupled to the watering housing to deliver a torque.

In some embodiments, the water tank may be disposed detachable from the upper body, and the first coupling and the second coupling may be coupled separably, and when the water tank is separated, the first coupling and the second coupling may be separated.

In some embodiments, the upper body may further include an upper inner body having a water tank insertion space and the watering motor may be installed at the upper inner body.

In some embodiments, the watering motor may be installed at an undersurface of the upper inner body and the watering motor may be disposed to penetrate the undersurface of the upper inner body.

In some embodiments, the lower body may include a blower fan housing, and the blower motor may be installed at the blower fan housing, and a blower fan may be coupled to the blower motor axis.

In some embodiments, the blower fan may be disposed at a lower side, and the blower motor may be disposed at an upper side of the blower fan, and the blower motor axis may extend downwardly to be coupled with the blower fan.

In some embodiments, the blower fan may be formed to surround the blower motor.

In some embodiments, the blower fan may be a centrifugal fan admitting air from a lower side and then discharging air in a radial direction.

In some embodiments, the blower fan may discharge air in a radial direction and discharge the air to be inclined upwardly.

In some embodiments, the upper body may further include: an upper outer body forming an appearance of the base body and coupled to the lower body; and an upper inner body disposed inside the upper outer body and coupled to the upper outer body, wherein the lower may further include: a lower outer body forming an appearance of the base body and coupled to the upper outer body; and a blower fan housing disposed inside the lower outer body and coupled to the lower outer body, wherein the watering motor may be installed at the upper inner body and the blower motor may be installed at the blower fan housing.

In some embodiments, the lower outer body may have a flat section that becomes narrower as it goes from a lower side to an upper side and the upper outer body may have a flat section that becomes narrower as it goes from an upper side to a lower side.

In some embodiments, the upper outer body and the lower outer body may be fastened and assembled.

In some embodiments, the upper inner body and the blower fan housing may be fastened and assembled.

In some embodiments, the upper outer body and the lower outer body may be fastened and assembled, and the upper inner body and the blower fan housing may be fastened and assembled, and the watering motor and the blower motor may form a motor separation interval and may be disposed vertically.

In some embodiments, the blower motor may include a blower motor axis, and the watering motor may include a watering motor axis, and the blower motor axis may be installed downwardly, and the watering motor axis may be installed upwardly.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Figure 1:
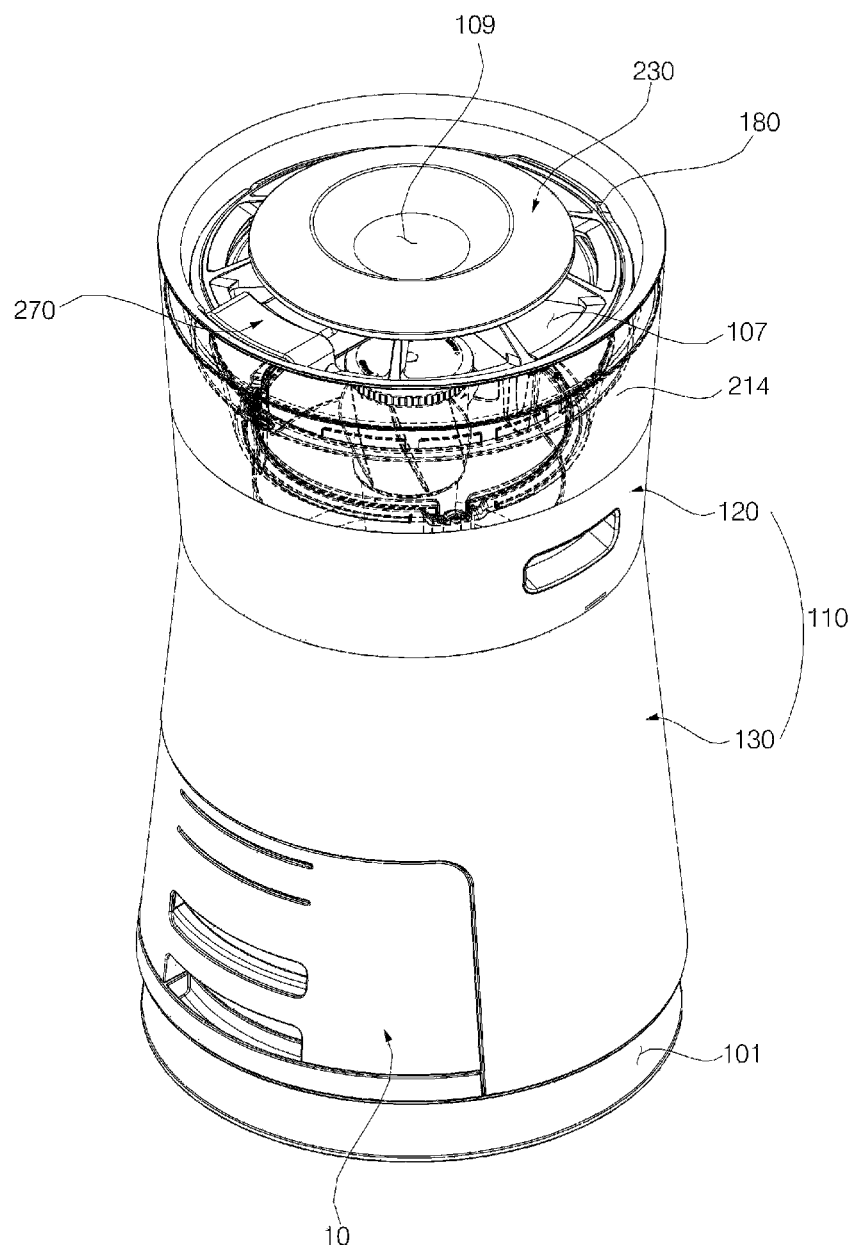
FIG. 1 is a perspective view illustrating a humidification and air cleaning apparatus according to a first embodiment of the present invention.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Hereinafter, exemplary embodiments of the present invention will be described in detail with reference to the accompanying drawings.

Figure 2:
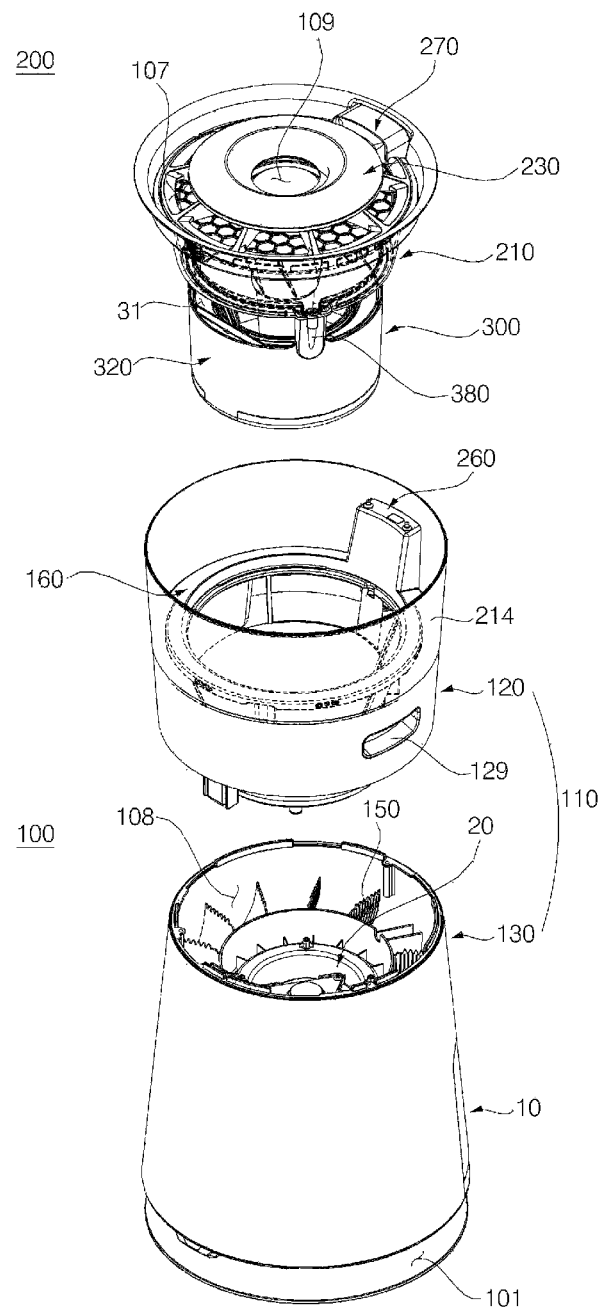
FIG. 2 is an exploded perspective view of FIG. 1.
Figure 3:
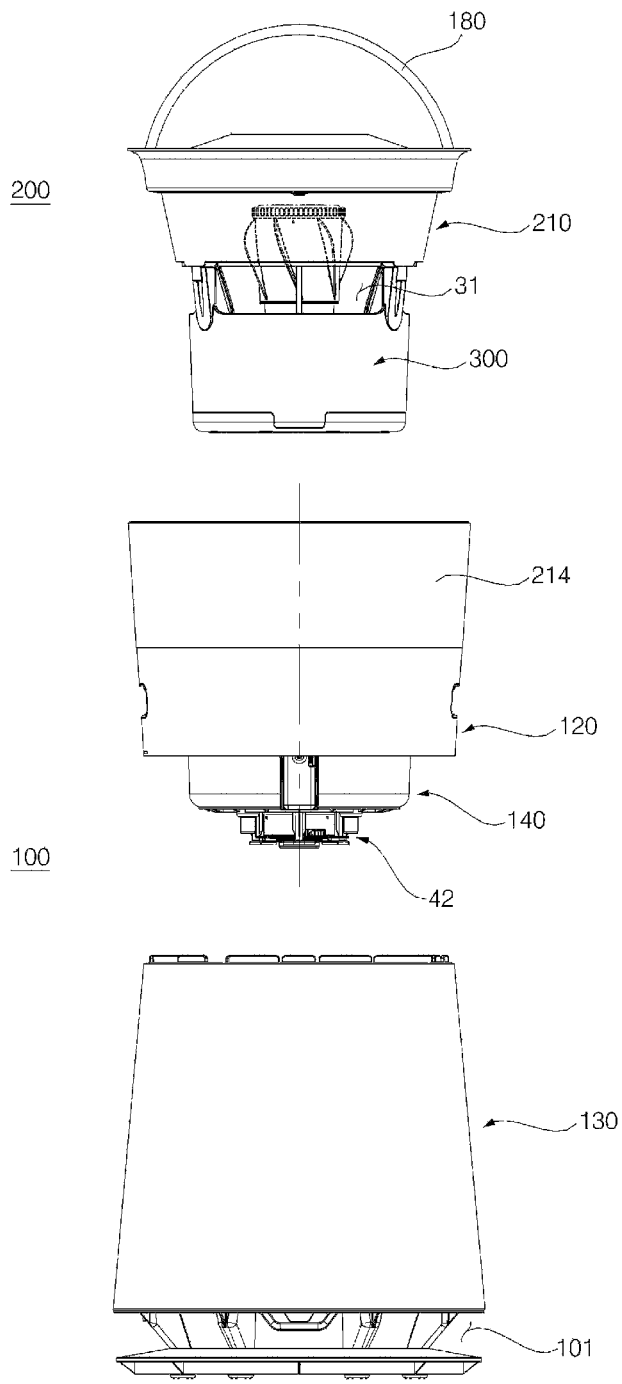
FIG. 3 is an exploded front view of FIG. 1.
Figure 4:
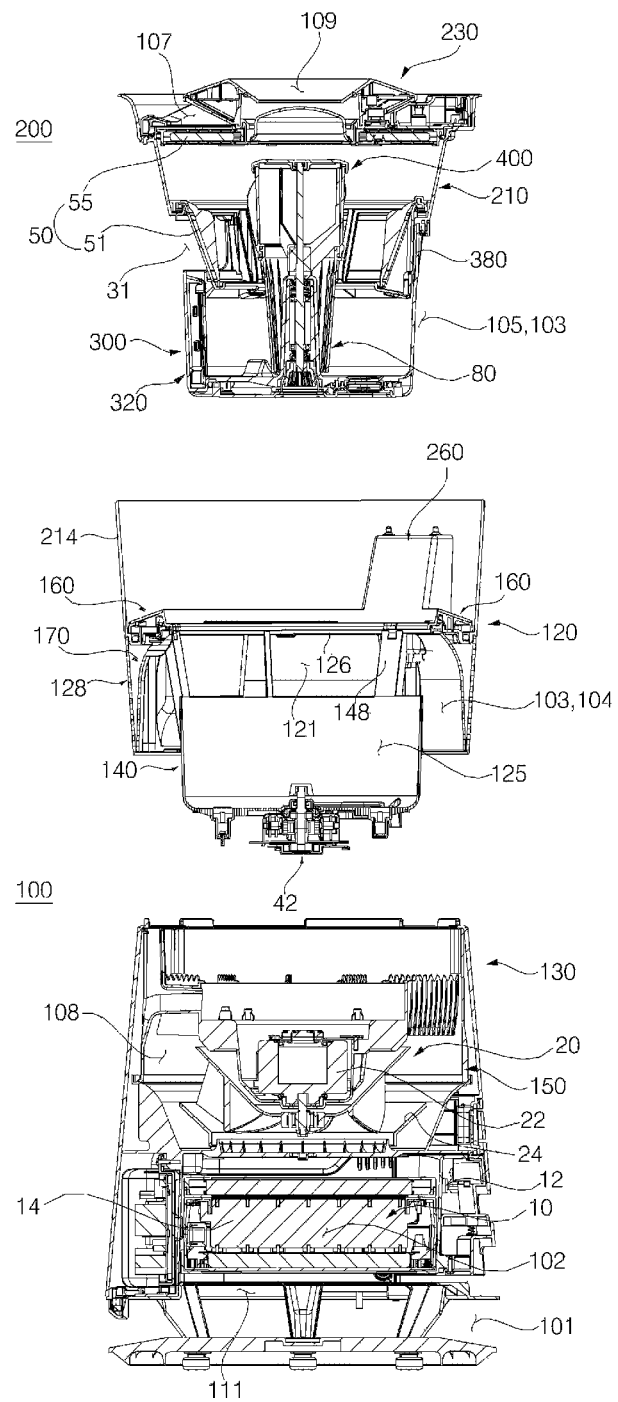
FIG. 4 is an exploded cross-sectional view of FIG. 3.
Figure 5:
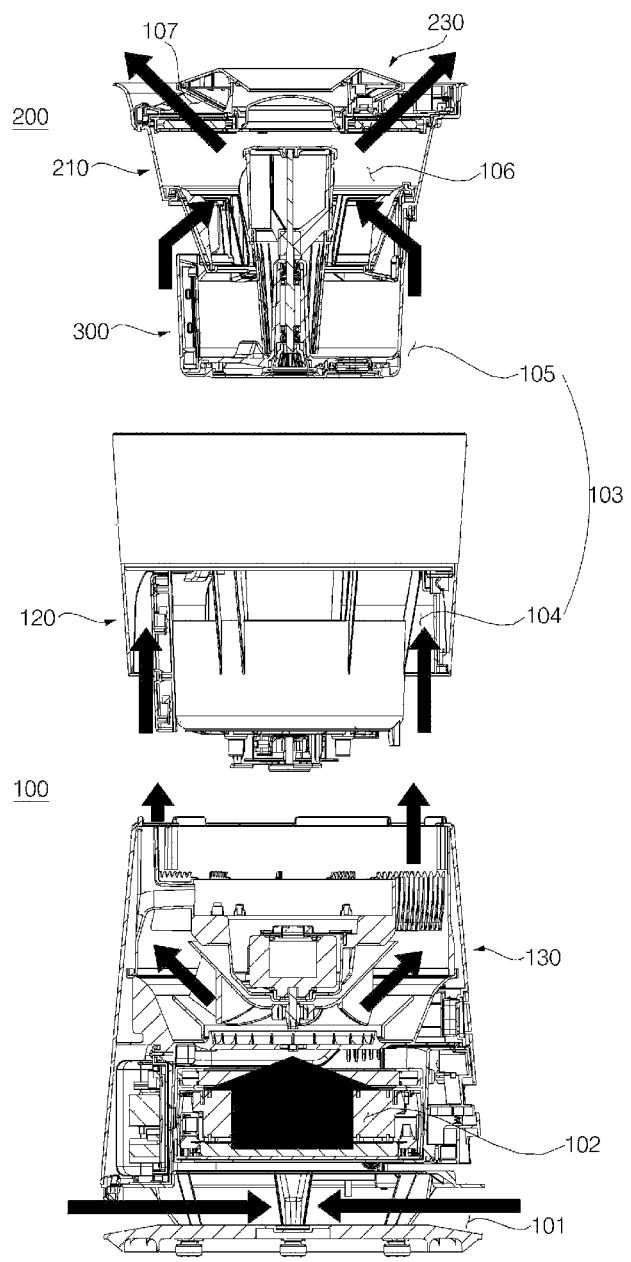
FIG. 5 is a view illustrating an air flow of the humidification and air cleaning apparatus according to the first embodiment of the present invention.

FIG. 1 is a perspective view illustrating a humidification and air cleaning apparatus according to a first embodiment of the present invention. FIG. 2 is an exploded perspective view of FIG. 1. FIG. 3 is an exploded front view of FIG. 1. FIG. 4 is an exploded cross-sectional view of FIG. 3. FIG. 5 is a perspective view when seen from the lower side of FIG. 2.

A humidification and air cleaning apparatus according to an embodiment of the present invention may include an air clean module 100 and an air wash module 200 disposed over the air clean module 100.

The air clean module 100 may take in and filter external air, and may provide filtered air to the air wash module 200. The air wash module 200 may be supplied with filtered air, may perform humidification to provide moisture, and may discharge humidified air to the outside.

The air wash module 200 may include a water tank 300 for storing water. The water tank 300 may be separable from the air clean module 100 when the air wash module 200 is separated. The air wash module 200 may be disposed over the air clean module 100.

A user can separate the air wash module 200 from the air clean module 100, and can clean the air wash module 200 that is separated. A user may also clean the inside of the air clean module 100 from which the air wash module 200 is separated. When the air wash module 200 is separated, the upper surface of the air clean module 100 may be opened to a user. The air clean module 100 may be cleaned after separately removing a filter assembly 10 described later.

A user may supply water into the air wash module 200. The air wash module 200 may have a water supply flow passage formed therein to supply water from the outside to the water tank 300.

The water supply flow passage may be configured to supply water into the water tank 300 at any moment. For example, even when the air wash module 200 is operating, water can be supplied through the water supply flow passage. For example, even when the air wash module 200 is coupled to the air clean module 100, water can be supplied through the water supply flow passage. For example, even when the air wash module 200 is decoupled from the air clean module 100, water can be supplied through the water supply flow passage.

The air clean module 100 and the air wash module 200 may be connected to each other through a connection flow passage 103. Since the air wash module 200 is separable, the connection flow passage 103 may be distributedly formed at the air clean module 100 and the air wash module 200.

The connection flow passage formed in the air clean module 100 may be defined as a clean connection flow passage 104, and the connection flow passage formed in the air wash module 200 may be defined as a humidification connection flow passage 105. When the air wash module 200 is mounted on the air clean module 100, for the first time, the connection flow passage may be connected and the flow passage of air may be configured accurately.

The flow of air passing through the air clean module 100 and the air wash module 200 will be described in more detail later.

A configuration of the air clean module 100 will be described in more detail as follows.

The air clean module 100 may include a base body 110 where an intake flow passage 101 and a clean connection flow passage 104 are formed, a filter assembly 10 disposed detachable from the base body 110 and performing filtration on flowing air, and an air blowing unit 20 disposed inside the base body 110 and flowing air.

External air may be entered into the inside of the base body 110 through the intake flow passage 101. The air filtered in the filter assembly 10 may be provided to the air wash module 200 through the clean connection flow passage 104.

In this embodiment, the base body 110 may be configured with two parts.

The base body 110 may include the lower body 130 defining the exterior thereof and having an inlet hole 110 formed in the undersurface thereof, and the upper body 120 defining the exterior thereof and coupled to the upper side of the lower body 130.

A display module 160 may be disposed in at least one of the air clean module 100 or the air wash module 200 to display the operational state to a user. In this embodiment, the display module 160 may be disposed in the base body 110 to display the operational state of the humidification and air cleaning apparatus to a user.

The upper body 120 and the lower body 130 may be assembled integrally. Unlike this embodiment, the upper body 120 and the lower body 130 may be manufactured as one.

The air wash module 200 may be detachably mounted on the upper side of the upper body 120 and support the weight of the air wash module 200.

The upper body 120 may provide a structure where the water tank 300 is mounted stably. The upper body 120 may have a structure where the water tank 300 of the air wash module 200 is separable. The upper body 120 may have a concave structure for receiving the water tank 300.

The upper body 120 may be convavely formed inside the base body 110 and the water tank 300 may be received inside the base body 110. Through this, the center of gravity of an air cleaner may be further moved to the lower side.

An air cleaner according to this embodiment may receive power through the air clean module 100 and provide power to the air wash module 200 through the air clean module 100. Since the air wash module 200 has a structure separable from the air clean module 100, the air clean module 100 and the air wash module 200 may be provided with a separable power supply structure.

Since the air clean module 100 and the air wash module 200 are assembled through the upper body 120, a connector 260 may be disposed in the upper body 120 to provide power for the air wash module 200. A top connector 270 may be disposed in the top cover assembly 230, and may be separably connected to the connector 260. When the top cover assembly 230 is placed, the top connector 270 may be disposed over the connector 260. The top cover assembly 230 may be supplied with electricity from the connector 260 via the top connector 270.

The filter assembly 10 may be assembled to be detachable from the base body 110.

The filter assembly 10 may provide the filtering flow passage 102, and may filter external air.

The filter assembly 10 may have a structure that is detachable from the base body 110 in a horizontal direction. The filter assembly 10 may be disposed so as to cross the flowing direction of air that flows upstream in a vertical direction. The filter assembly 10 may be disposed in a horizontal direction orthogonal to the flow of air flowing from the lower side to the upper side.

The filter assembly 10 may slide in a horizontal direction with respect to the base body 110.

The air blowing unit 20 may generate flowing of air. The air blowing unit 20 may be disposed inside the base body 110, and may allow air to flow from the lower side to the upper side.

The air blowing unit 20 may include a blower housing 150, a blower motor 22, and a blower fan 24. In this embodiment, the blower motor 22 may be disposed at an upper side, and the blower fan 24 may be disposed at a lower side. The blower motor 22 may include a blower motor axis 23 and the blower motor axis 23 may be installed downwardly and a blower fan 24 may be coupled to the blower motor axis 23.

The blower housing 150 may be disposed inside the base body 110. The blower housing 150 may provide a flow passage of flowing air. The blower motor 22 and the blower fan 24 may be disposed in the blower housing 150.

The blower housing 150 may be disposed over the filter assembly 10, and may be disposed under the upper body 120.

The blower fan 24 may be a centrifugal fan, and may admit air from the lower side thereof and discharge air to the outside in a radial direction. The blower fan 24 may discharge air to the upper side and the outside in a radial direction. The outer end of the blower fan 24 may be disposed to direct to the upper side in a radial direction.

The blower motor 22 may be disposed over the blower fan 24 to minimize contact with flowing air. The blower motor 22 may not be located on an air flow passage by the blower fan 24.

The air wash module 200 may include a water tank 300, a watering unit 400, a humidification medium 50, a visual body 210, and a top cover assembly 230. The water tank 300 may store water for humidification, and may be detachably disposed over the air clean module 100. The watering unit 400 may be disposed in the water tank 300, and may spray water in the water tank 300. The humidification medium 50 may be wetted with water sprayed from the watering unit 400, and may provide moisture to flowing air. The visual body 210 may be coupled to the water tank 300, and may be formed of a transparent material. The top cover assembly 230 may be detachably disposed over the visual body 210, and may include a discharge flow passage 107 through which air is discharged and a water supply flow passage 109 through which water is supplied.

The water tank 300 may be mounted on the upper body 120. The watering unit 400 may be disposed inside the water tank 300, and may rotate inside the water tank 300.

The watering unit 400 may draw water inside the water tank 300, upwardly pump the drawn water, and then spray the pumped water toward the outside in a radial direction. The watering unit 400 may include the watering housing 800 that draws water, upwardly pumps drawn water, and then sprays pumped water toward the outside in a radiation direction.

Water sprayed from the watering housing 800 may wet the humidification medium 50. Water sprayed from the watering housing 800 may be sprayed toward at least one of the visual body 210 and the humidification medium 50.

In this embodiment, the watering housing 800 may spray water to the inner side surface of the visual body 210, and sprayed water may flow down along the inner side surface of the visual body 210. Droplets formed in a form of water drop may be formed on the inner side surface of the visual body 210, and a user can see droplets through the visual body 210.

The visual body 210 may be coupled to the water tank 300, and may be located over the water tank 300. At least a portion of visual body 210 may be formed of a material through which a user can see the inside.

The droplet formed at the inner side surface of the visual body 210 may implement a raindrop shape. The droplet flowing down from the visual body 210 may wet the humidification medium 50.

A display module 160 may be disposed outside the visual body 210. The display module 160 may be coupled to any one of the visual body 210 and the upper body 120. In this embodiment, the display module 160 may be disposed at the upper body 120.

When the air wash module 200 is placed, the outer surface of the visual body 210 may adhere closely to the display module 160. At least a portion of the surface of the display module 160 may be formed of a material that reflects light.

Droplets formed on the visual body 210 may also be projected onto the surface of the display module 160. Accordingly, a user can observe the motion of droplets at both visual body 210 and display module 160.

The water tank 300 may include a water tank inlet 31 through which air passes. The air supplied from the air clean module 100 may flow into the air wash module 200 through the water tank inlet 31.

The humidification medium 50 may include a water tank humidification medium 51 disposed at the connection flow passage 103, and a discharge humidification medium 55 disposed at the discharge flow passage 107.

The water tank humidification medium 51 may be disposed on the connection flow passage 103 and in this embodiment, may be disposed at the water tank inlet 31 of the water tank 300. The water tank humidification medium 51 may be disposed inside the water tank inlet 31 and provide humidification on air passing through the water tank inlet 31.

The water tank humidification medium 51 may cover the water tank inlet 31, and air may penetrate the water tank humidification medium 51 to flow into the water tank 300.

The discharge humidification medium 55 may be disposed on the discharge flow passage 107. The discharge humidification medium 55 may be disposed on at least one of the visual body 21 or the top cover assembly 230. In this embodiment, the discharge humidification medium 55 may be disposed at the top cover assembly 230.

The discharge humidification medium 55 may cover the discharge flow passage 107, and air may penetrate the discharge humidification medium 55 to flow to the outside of the top cover assembly 230.

Hereinafter, the flow of air will be described with reference to the accompanying drawings.

When the air blowing unit 20 operates, external air may flow into the base body 110 through the intake flow passage 101 formed at a lower side of the base body 110. Air entered through the intake flow passage 101 may pass the air clean module 100 and the air wash module 200 while moving upward, and may be discharged to the outside through the discharge flow passage 107 formed at an upper side of the air wash module 200.

The air entered to the intake flow passage 101 may pass through the filtering flow passage 102 of the filter assembly 10. As the air passes through the filtering flow passage 102, the filter assembly 10 may filter external air.

Air passing the filtering flow passage 102 may flow to the connection flow passage through the air blowing unit 20. After the air passing through the filtering flow passage 102 is pressed by the blower fan 24, it flows to the connection flow passage 103 along the blower fan housing 150.

Since the air blowing unit 20 is disposed next to the filtering flow passage 102, adherence of foreign substances like dust on the blower fan 24 can be minimized.

If the air blowing unit 20 is disposed before the filtering flow passage 102, foreign substances may be attached to the blower fan 24, and due to this, a cleaning cycle may be shortened.

Also, since the air blowing unit 20 is disposed at the front of the humidification flow passage 106, adherence of moisture on the surface of the blower fan 24 can be minimized. When moisture adheres to the surface of the blower fan 24, foreign substances may adhere to the surface of the blower fan 24 or molds may be likely to grow on the blower fan 24.

Since the air blowing unit 20 is disposed between the filtering flow passage 102 and the humidification flow passage 106, the adherence of foreign substances may be minimized and the flow pressure of air may be provided appropriately.

The connection flow passage 103 may include the clean connection flow passage 104 formed in the air clean module 100 and the humidification connection flow passage 105 formed in the air wash module 200.

When the air wash module 200 is placed on the upper body 120, the clean connection flow passage 104 and the humidification connection flow passage 105 may be connected to each other. When the air wash module 200 is in a separated state, the clean connection flow passage 104 and the humidification connection flow passage 105 may be exposed to the outside.

The clean connection flow passage 104 may be formed in the upper body 120, and the humidification connection flow passage 105 may be formed in the air wash module 200.

The clean connection flow passage 104 and the humidification connection flow passage 105 may also be formed in a form of duct to form a clear flow passage. In this embodiment, when the connection flow passage 103 is distributed as a partial structure of the upper body 120 and a partial structure of the water tank 300 and the air wash module 200 is mounted on the upper body 120, the connection flow passage 103 may be formed.

In this embodiment, the upper body 120 may provide the outer structure of the connection flow passage 103 and the water tank 300 may provide the inner structure of the connection flow passage 103.

That is, the connection flow passage 103 may be formed between the outside of the water tank 300 and the inside of the upper body 120. Therefore, the connection flow passage 103 may be formed between the water tank 300 and the upper body 120. The water tank 300 may form an inner wall of the connection flow passage 103 and the upper body 120 may form an outer wall of the connection flow passage 103.

In such a manner, the structure of the connection flow passage 103 may minimize a structure for forming a flow passage through a distributed arrangement. The connection flow passage 103 may be formed in a vertical direction.

Air passing through the connection flow passage 103 may flow into the humidification flow passage 106. The humidification flow passage 106 may be a section where moisture is supplied. In this embodiment, the humidification flow passage 106 may be a flow passage from the water tank humidification medium 51 to the discharge humidification medium 55.

While air passes through the water tank humidification medium 51, moisture may be supplied to the air in the connection flow passage 51. Then, water drops scattered from the watering unit 400 and moistures evaporated from the water tank 300 may be provided into the water tank 300.

As air passes through the discharge humidification medium 55, moisture may be supplied again to the air in the water tank 300.

Moisture may be supplied in the humidification flow passage 106 through the water tank humidification medium 51, the inside of the water tank 300, and the discharge humidification medium 55.

Air passing through the discharge humidification medium 55 may be exposed to the outside through the discharge flow passage 107.

Figure 6:
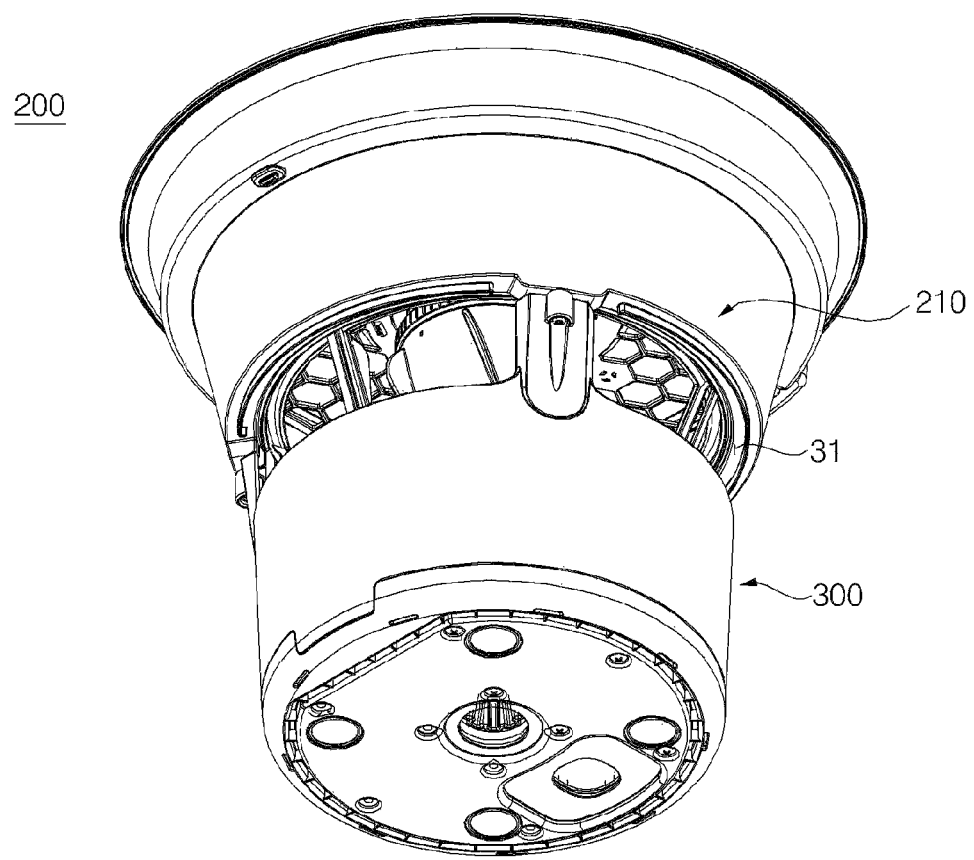
FIG. 6 is a perspective view of an air wash module shown in FIG. 2 when seen from the lower side.
Figure 7:
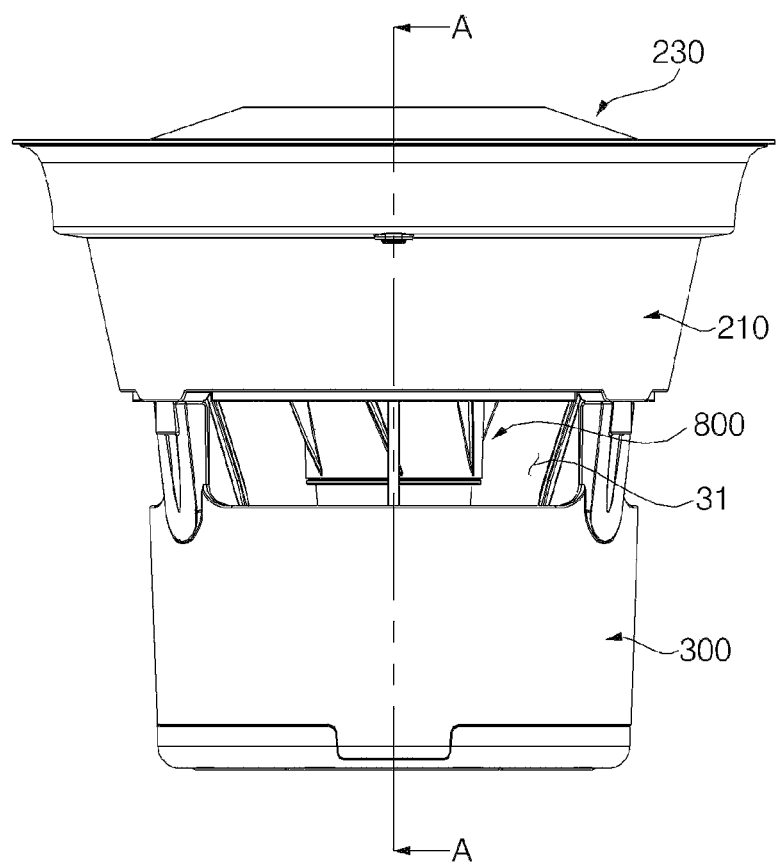
FIG. 7 is a front view of an air wash module shown in FIG. 2.
Figure 8:
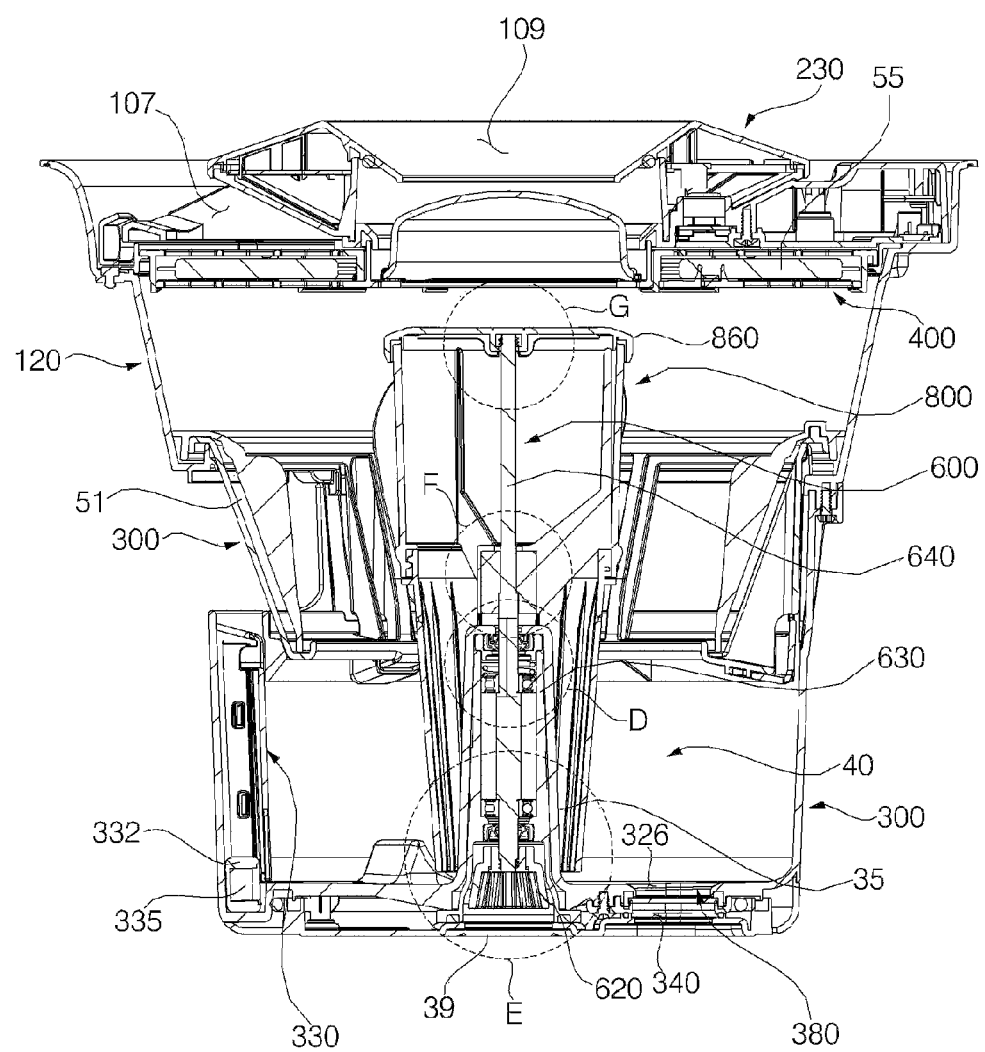
FIG. 8 is a cross-sectional view taken along a line A-A of FIG. 7.
Figure 9:
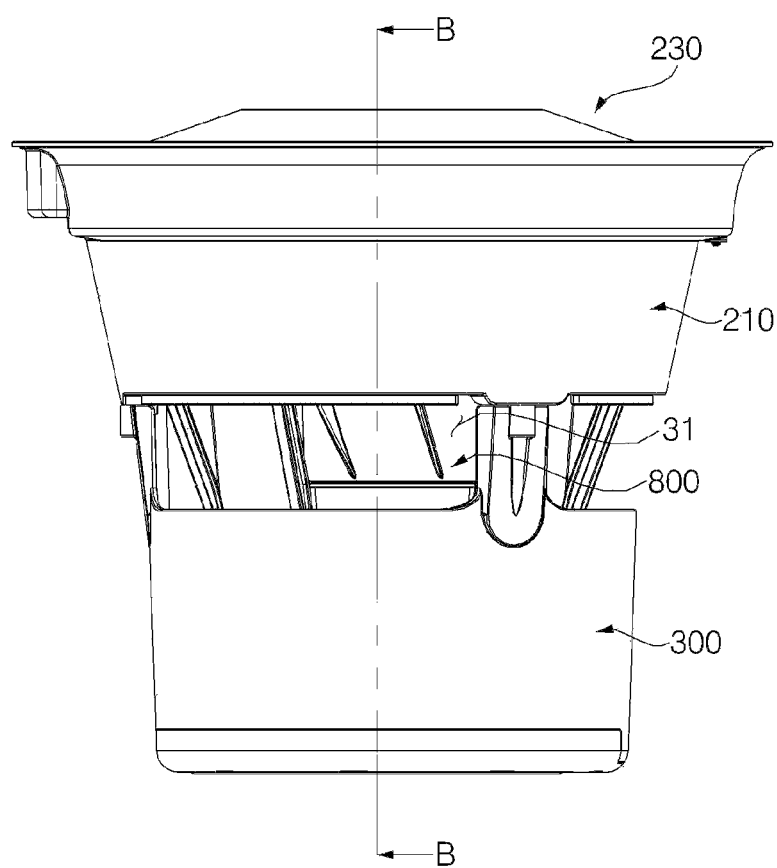
FIG. 9 is a left cross-sectional view of the air wash module shown in FIG. 2.
Figure 10:
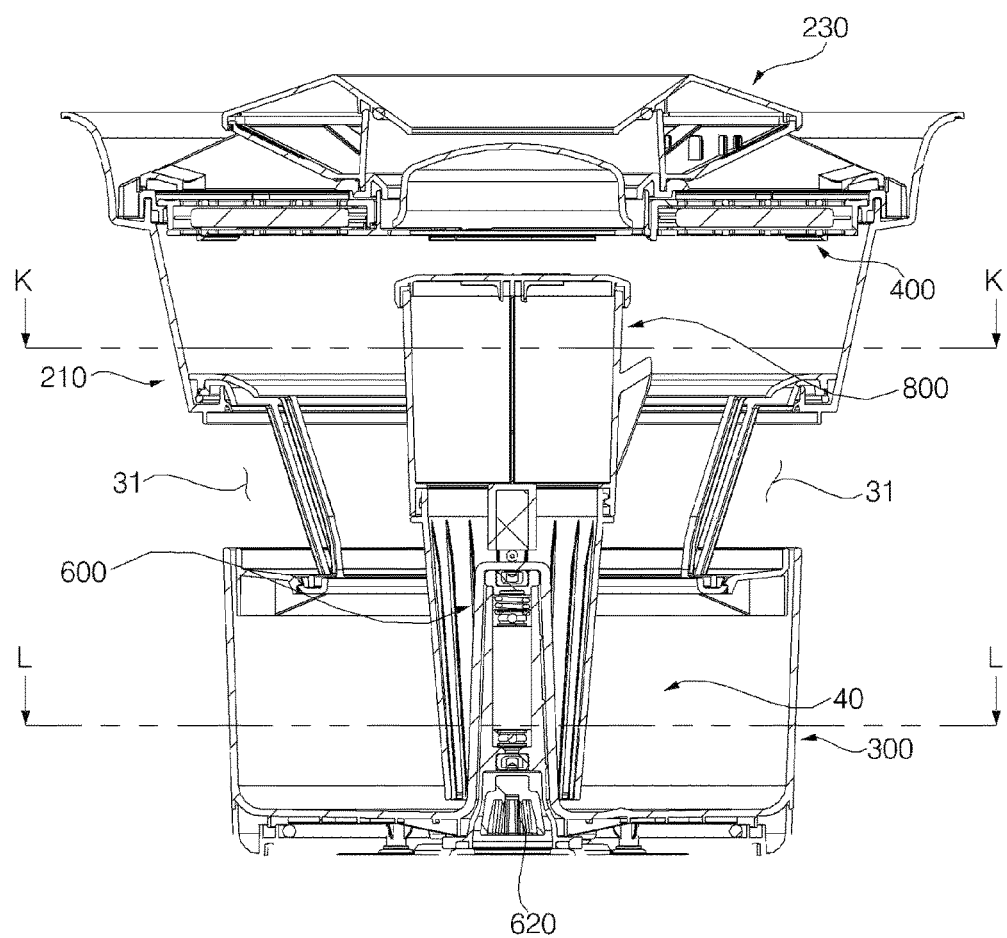
FIG. 10 is a cross-sectional view taken along a line B-B of FIG. 9.
Figure 11:
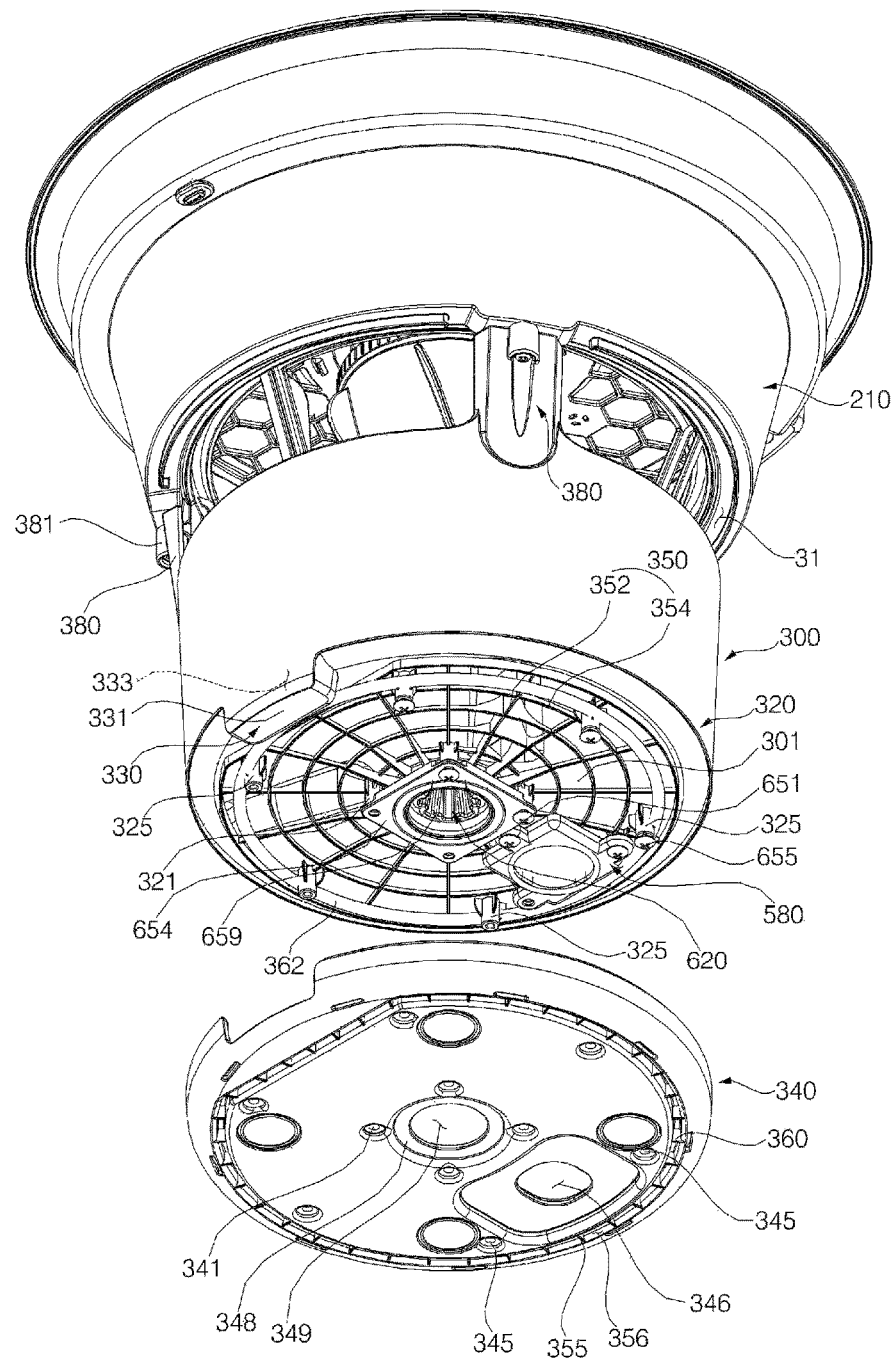
FIG. 11 is an exploded perspective view of the water tank base shown in FIG. 6.
Figure 12:
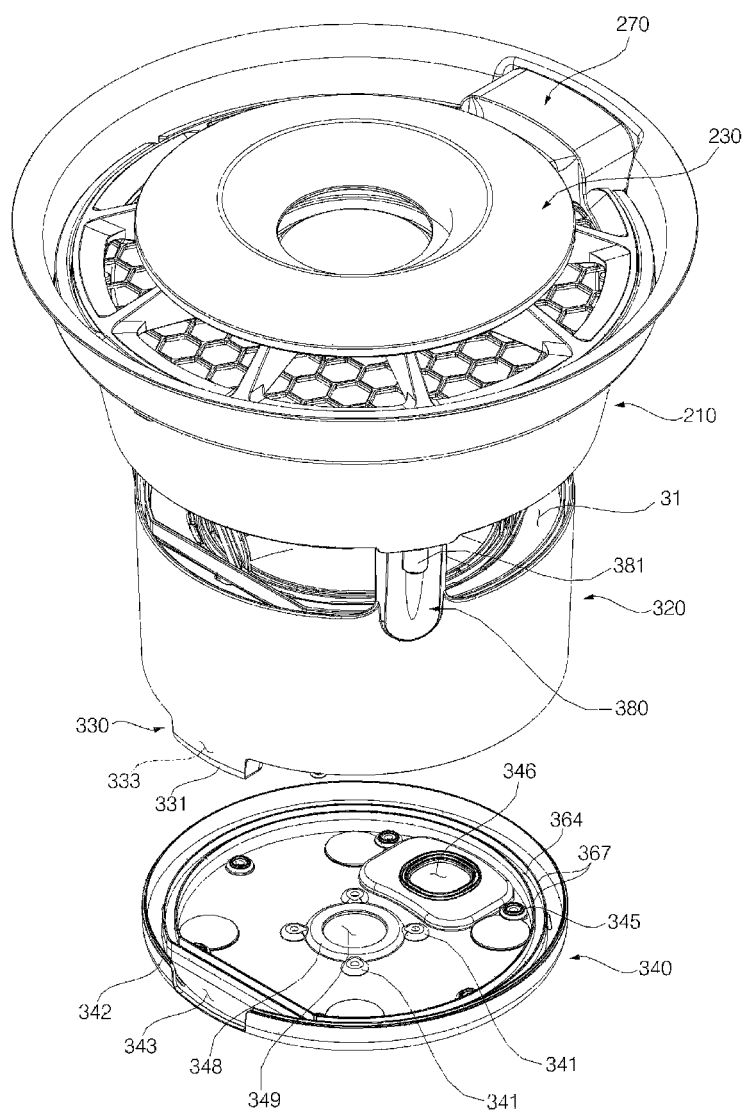
FIG. 12 is a perspective view when seen from the upper side of FIG. 11.
Figure 13:
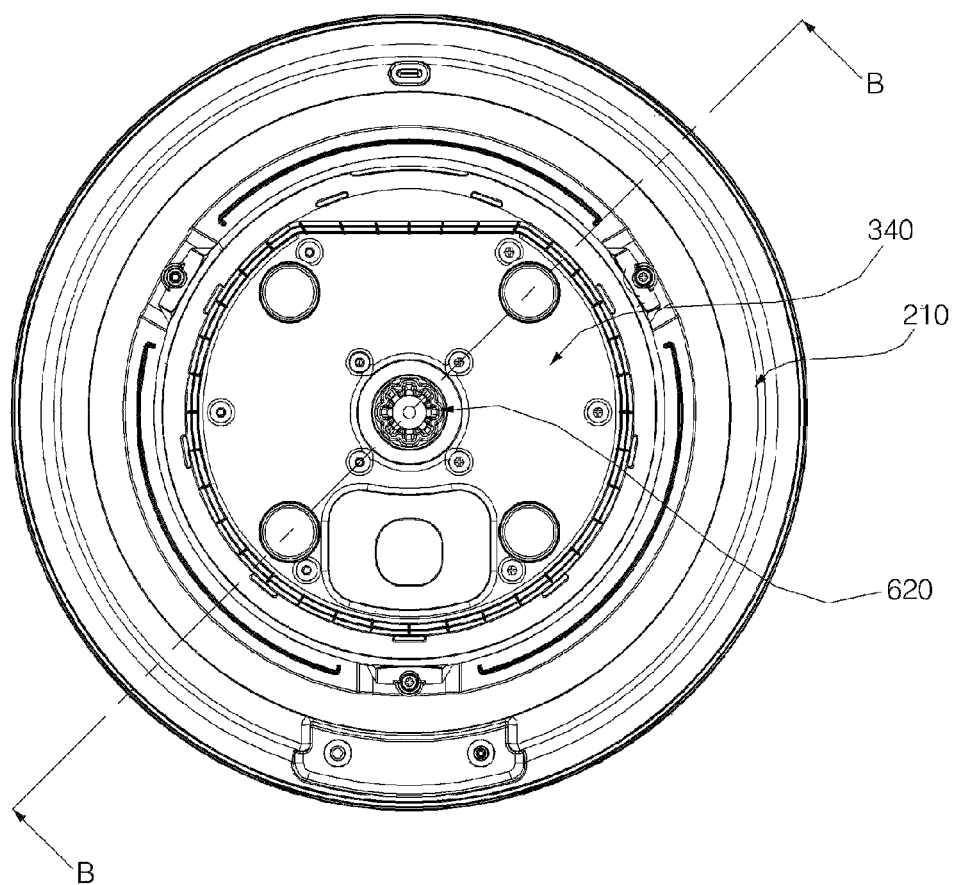
FIG. 13 is a bottom view of FIG. 11.
Figure 14:
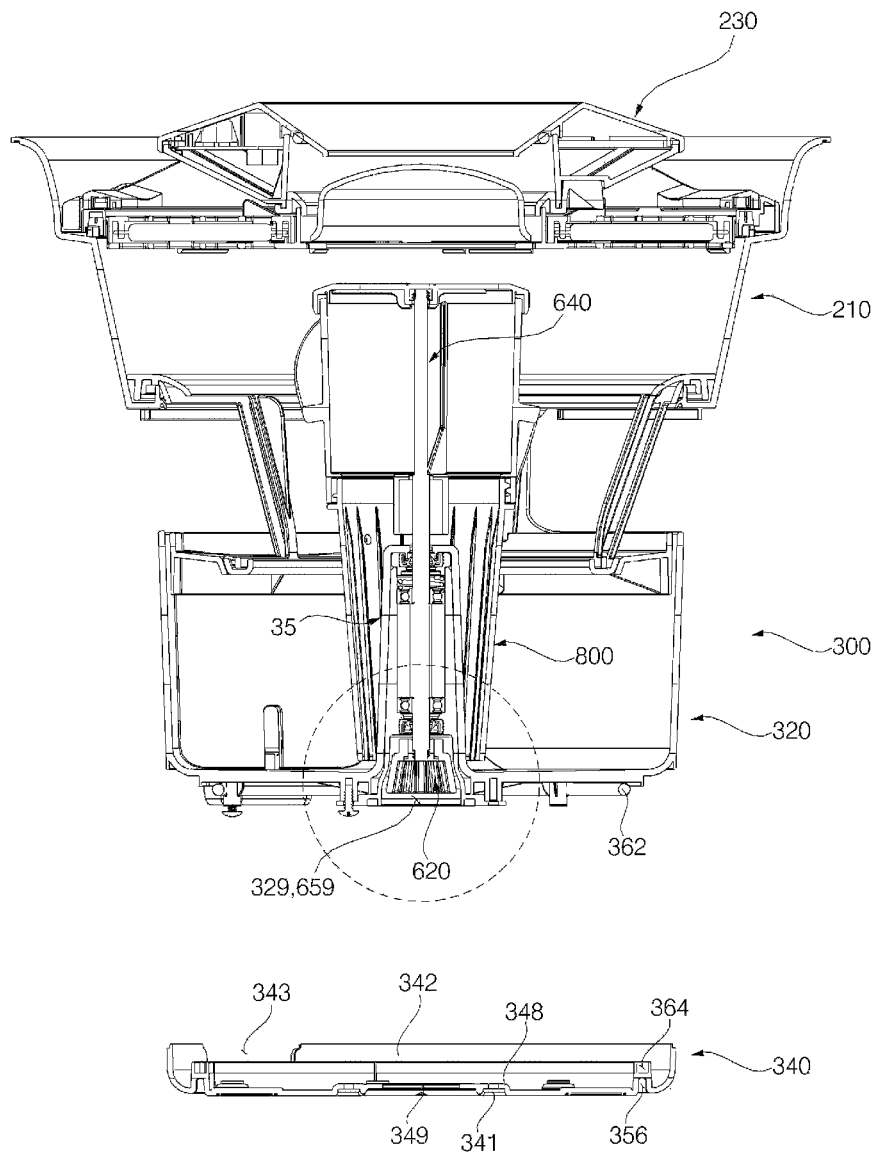
FIG. 14 is a cross-sectional view taken along a line B-B of FIG. 13.
Figure 15:
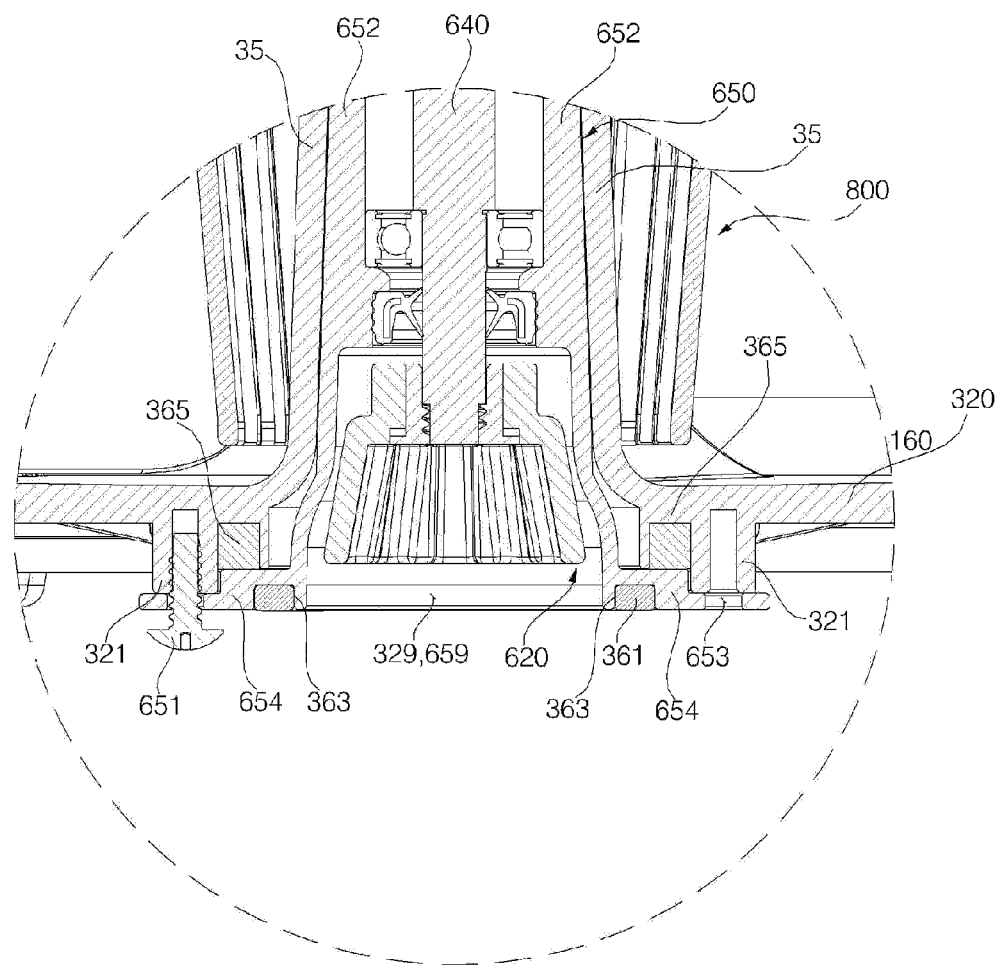
FIG. 15 is a partial enlarged view of FIG. 14.

FIG. 6 is a cross-sectional view illustrating the air wash module shown in FIG. 2 when seen from the lower side. FIG. 7 is a front view of the air wash module shown in FIG. 2. FIG. 8 is a cross-sectional view taken along a line A-A of FIG. 7. FIG. 9 is a left cross-sectional view of the air wash module shown in FIG. 2. FIG. 10 is a cross-sectional view taken along a line B-B of FIG. 9. FIG. 11 is an exploded perspective view of the water tank base shown in FIG. 6. FIG. 12 is a perspective view when seen from the upper side of FIG. 11. FIG. 13 is a bottom view of FIG. 11. FIG. 14 is a cross-sectional view taken along a line B-B of FIG. 13. FIG. 15 is a partial enlarged view of FIG. 14.

Referring to the drawings, the water tank 300 may include a water tank body 320 for storing water, a water tank base 340 coupled to the lower part of the water tank body 320, a water tank inlet 31 formed at a side surface of the water tank body 320, a column 35 disposed inside the water tank body 320 and protruding upwardly, and a floater housing 330 disposed inside the water tank body 320 and including a floater 332 that moves in a vertical direction.

In this embodiment, the water tank body 320 may be formed into a cylindrical shape with an opened upper side. Unlike this embodiment, the water tank body 320 may be formed into various shapes.

The column 35 may be formed at the water tank body 320, and a power transmission module 60 described later may be disposed inside the column 35. The column 35 may prevent or suppress the water stored in the water tank body 320 from contacting the power transmission module 60.

The water tank base 340 may be coupled to the outer undersurface of the water tank body 320. A predetermined space may be formed between the water tank base 340 and the water tank body 320. The space formed between the water tank body 320 and the water tank base 340 may be defined as a water tank base space 311. The water tank base space 311 may be sealed from the outside and may be configured to prevent water penetration.

The water tank body extension part 380 may upwardly extend from the water tank 300. The water tank body extension part 380 may form the water tank inlet 31. The water tank inlet 31 may be formed between the water tank body extension parts 380.

The water tank inlet 31 may be formed in the side surface of the water tank body 320. The water tank inlet 31 may be formed in all directions of 360 degrees of a circumference the water tank body 320. The water tank inlet 31 may communicate with the connection flow passage 103.

The water tank body extension part 380 may guide water flowing down from the inner side surface of the visual body 210 into the water tank 300. The noise of dropping water can be minimized by guiding water flowing down from the visual body 210.

The water tank body extension part 380 may be fastened to the lower end of the visual body 210. A water tank fastening part 381 fastened to the visual body 210 may be disposed on at least one of the plurality of water tank body extension parts 380. The water tank fastening part 381 may be disposed outside the water tank body extension part 380. The visual body 210 and the water tank 300 may be coupled to each other through a fastening member (not shown) fastened to the water tank fastening part 381.

The column 35 may be disposed at the water tank body 320. In this embodiment, the column 35 may be formed in a conical shape. The watering housing 800 may be installed to surround the column 35. In this embodiment, the column 35 may be integrally formed with the water body 320. The column 35 may be formed protruding upwardly from the undersurface of the water tank body 320.

The floater housing 330 may be formed inside the water tank body 320. The floater 322 may be disposed inside the floater housing 330. The floater 332 may be formed of a material having a lighter specific gravity than water and move vertically according to a level of water stored in the water tank 300 inside the floater housing 330.

The floater housing 330 may be installed at the inner sidewall of the water tank body 320. The floater housing 330 may extend long in a vertical direction. The floater housing 330 may have a structure where water of the water tank body 300 flows.

The lower end 331 of the floater housing 330 may protrude downwardly from the undersurface of the water tank body 320. A space formed protruding toward the lower side of the water tank body 320 may be defined as a floater storage space 333.

When the floater 332 is located in the floater storage space 333, it may be a state that there is no water in the water tank 300.

The floater 332 may be part of a water level sensor. A permanent magnet 335 may be disposed at the floater 332. The water level sensor may include a magnetic sensor 334 for detecting the magnetic force of the permanent magnet 335. The magnetic sensor 334 may be disposed at the upper body 120.

Therefore, the water level sensor may detect a water level of the water tank 300 in a non-contact method. Especially, since the water tank 300 is a separable structure, it may be desirable to detect a water level through a non-contact method. Whether the water tank 300 is mounted may be determined by using a signal detected from the water level sensor. For example, when the magnetic sensor 334 detects the permanent magnet, a controller (not shown) may determine that the water tank 300 is mounted.

The water tank base 340 may include a base border 342 protruding upwardly from the undersurface, and a groove 343 where the lower end 331 of the floater housing 330 is inserted may be formed in the base border 342. The lower end 331 may be inserted into the groove 343. The lower end 331 may be exposed through the groove 343. The lower end 331 of the floater housing 330 exposed through the groove 343 may allow easy detection of the magnetic sensor 334.

When the lower end 331 is surrounded by the base border 342, a magnetic field signal for the permanent magnet may be reduced and due to this, incorrect detection may occur.

By exposing the lower end 331 through the groove 343, the permanent magnet of the floater 332 located inside the lower end 331 may be easily detected.

A configuration for improving the rigidity of the water tank 300 may be disposed in the water tank body 320 and the water tank base 340. The water tank 300 may be used as a space for storing water and also may support the watering unit 400 rigidly. Through this, the water tank 300 should suppress vibration occurring from the watering unit 400.

When the watering unit 400 is not supported sufficiently, the floor 301 of the water tank body 320 may be changed or shaken, and vibration may occur. The vibration occurring from the water tank 300 may spread throughout the entire structure and therefore, an adverse effect on the entire humidification and air cleaning apparatus may occur.

In order to minimize this, a configuration for improving the rigidity may be disposed in the water tank body 320 and the water tank base 340.

The undersurface of the column 35 formed at the water tank body 320 may be open. The open undersurface of the column 35 may be referred to as a water tank body insertion hole 329. A bearing housing 650 described later may be inserted through the water tank body insertion hole 329. The bearing housing 650 may be a composition of the power transmission module 600.

The base insertion hole 349 may be formed inside the water tank base 340. The base insertion hole 349 may be disposed at the lower side of the water tank body insertion hole 329. The bearing insertion hole 349 may be located at the lower side of the bearing housing 650.

The lower part of the bearing housing 650 may be exposed through the base insertion hole 349. A first coupler 610 described later may be inserted into the base insertion hole 349.

The bearing housing 659 may include a bearing housing body 652 inserted into the column 35 and a housing flange 654 formed at the lower end of the bearing housing body 652 and closely contacting the undersurface of the water tank body 320.

The lower surface of the bearing housing 650 may be formed open. The open undersurface of the hearing housing 650 may be referred to as a bearing housing insertion hole 659. A second coupler 620 described later may be disposed in the bearing housing insertion hole 659.

The bearing housing insertion hole 659 and the base insertion hole 349 may communicate with each other.

The base insertion hole 349 may be located at the lower side of the bearing housing insertion hole 659. The second coupler 620 may be exposed through the base insertion hole 349. The first coupler 610 may be inserted through the base insertion hole 349 and may be detachably coupled to the second coupler 620.

The housing flange 654 may be formed to the outside in a radial direction. The housing flange 654 may closely contact the lower undersurface of the water tank body 320. When seen from a plane, the housing flange 654 may be formed wider than the plane of the column 35.

The column 35 and the housing flange 654 may be disposed on the concentric axis.

The housing flange 654 may be fastened to the water tank 300 through a fastening member 651. The fastening member 651 may be fastened to the water tank body 320 through the housing flange 654.

Separately from a first fastening member 651 for fixing the bearing housing 650, a fastening member 655 for fixing the water tank body 320 and the water tank base 340 may be disposed.

The fastening member 651 for fixing the bearing housing 650 may be defined as the first fastening member 651 and the fastening member 655 for fixing the water tank body 320 and the water tank base 340 may be defined as a second fastening member.

In this embodiment, the first fastening member 651 may fasten the water tank base 340, the housing flange 654, and the water tank body 320 at a time. Since the first fastening member 651 fastens three compositions at the same time, the bearing housing 650 may be more robustly fixed. Since the first fastening member 651 fastens three compositions at the same time, the lower rigidity of the water tank 300 may be improved.

In order to install the first fastening member 651, fastening parts 321 and 341 may be formed at the water tank body 320 and the water tank base 340, respectively.

A body fastening part 321 formed at the water tank body 320 may be formed in a boss shape, and base fastening part 341 formed at the water tank base 340 may be formed in a hole shape.

A flange fastening part 653 that the first fastening member 651 penetrates may be formed at the housing flange 654. The flange fastening part 653 may be in a hole shape.

The first fastening member 651 is a screw and is fixed to the body fastening part 321 through the base fastening part 341 and the housing flange 654. The first fastening member 651 is fastened to the upper side at the lower side.

Each of the first fastening member 651 and the fastening parts 341, 653, and 321 may be formed in plurality. The first fastening member 651 may be disposed at least two, and in this embodiment, four may be radially disposed based on the power transmission axis 640.

When seen from a plane, the first fastening member 651 may be disposed at 90-degree equal intervals on the basis of the power transmission axis 640. Separately from a first fastening member 651 for fixing the bearing housing 650, a fastening member 655 for fixing the water tank body 320 and the water tank base 340 may be disposed.

The first fastening member 651 for fixing the bearing housing 650 may be defined as the first fastening member 651 and the fastening member 655 for fixing the water tank body 320 and the water tank base 340 may be defined as a second fastening member 655.

The fastening member 655 may improve the rigidity of the water tank 300 by coupling the water tank body 320 and the water tank base 340.

The second fastening member 655 is for coupling the water tank body 320 and the water tank base 340. Unlike this embodiment, through a mutual catch through a hook instead of a fastening member, a water tank body and a water tank base may be coupled to each other. When coupling is implemented through a mutual catch, since a fine interval is formed, it may be vulnerable to vibration. In this embodiment, in order to prevent this, the water tank body 320 and the water tank base 340 are coupled to each other through the second fastening member 655.

The second fastening member 655 may be fastened at the lower part of the water tank base 340 and fastened to the water tank body 320 through the water tank base 340. A fastening part 325 to which the second fastening member 655 is fastened may be formed at the undersurface of the water tank body 320.

A fastening part 321 coupled to the first fastening member 651 may be defined as a first fastening part 321. A fastening part 325 coupled to the second fastening member 655 may be defined as a second fastening part 325. A fastening part 341 formed at the water tank base 340 may be defined as a base fastening part 341.

The second fastening part 325 may be formed protruding downwardly from the undersurface of the water tank body 320. The second fastening part 325 may be formed in a boss shape.

The second fastening part 325 may be disposed radially on the basis of the power transmission axis 640. The second fastening part 325 may be disposed in plurality around the power transmission axis 640 and each may be disposed at an equal interval. In this embodiment, six second fastening parts 325 may be disposed at 60-degree equal intervals on the basis of the power transmission axis 640.

Through the second fastening member 655, the water tank base 340 may closely contact the undersurface of the water tank body 320 and may be fixed to it, and also may closely contact the housing flange 654.

A flange supporter 348 for supporting the housing flange 654 may be formed at the water tank base 340. The flange supporter 348 may protrude upwardly.

The flange supporter 348 may be formed around the base insertion hole 349. In this embodiment, the flange supporter 348 may be formed circularly along the base insertion hole 349.

The base fastening part 341 may be disposed outside the flange supporter 348. That is, when the flange supporter 348 supports the bearing housing 650, the first fastening member 651 may fasten the water tank base 340, the housing flange 654, and the water tank body 320.

Moreover, ribs for improving each strength may be disposed at the water tank body 320 and the water tank base 340.

A rib formed at the water tank 320 in order for strength enhancement may be referred to as a body enhancement rib 350 and a rib formed at the water tank base 340 may be referred to as a base enhancement rib 355.

The body enhancement rib 350 may be formed at the floor 301 of the water tank body 320. The body enhancement rib 350 may be formed protruding downwardly from the undersurface of the water tank body 320.

The body enhancement rib 350 may include a first enhancement rib 352 formed radially based on the power transmission axis 640 and a second enhancement rib 354 formed circumferentially based on the power transmission axis 640.

The first enhancement rib 352 may be formed extending from the water tank body insertion hole 329 to the edge. The first enhancement rib 352 may be radially formed in plurality.

The second enhancement rib 354 may be disposed to form a concentric circle to the outside in a radial direction from the water tank body insertion hole 329. The second enhancement rib 354 may be disposed in plurality to the outside in a radial direction while forming a concentric circle.

The first enhancement rib 352 and the second enhancement rib 354 may intersect each other.

Through the first enhancement rib 352 and the second enhancement rib 354, a thickness of the water tank body 320 may be minimized and its strength may be maintained with the minimized thickness.

Through the first enhancement rib 352 and the second enhancement rib 354, it may be minimized that the vibration of the bearing housing 650 is delivered to the outside of the water tank 300 in a radial direction.

Through the first enhancement rib 352 and the second enhancement rib 354, eccentricity may be minimized during an operation of the watering unit 400. Since the watering unit 400 extends long in a vertical direction, when the strength of the floor 301 of the water tank 300 is enhanced, eccentricity may be minimized at the upper end of the watering unit 400.

The base enhancement rib 355 may be formed along the edge of the water tank base 340.

A groove 356 concaved in a vertical direction may be formed in the water tank base 340, and the base enhancement rib 355 may be formed at the groove 356.

The groove 356 may be formed along the edge of the water tank base 340. The groove 356 may form a closed curve when seen from the undersurface of the water tank base 340.

The base enhancement rib 355 may be disposed in plurality along the groove 356.

Moreover, a sealing structure for suppressing water penetration may be disposed between the water tank body 320 and the water tank base 340.

A first packing for sealing the inner edges of the water tank body 320 and the water tank base 340 and a second packing 362 for sealing the outer edges of the water tank body 320 and the water tank base 340 may be disposed.

The first packing 361 may prevent water or moisture from entering through the base insertion hole 349. The second packing 362 may prevent water or moisture from entering through the outer edges of the water tank body 320 and the water tank base 340.

In order to install the first packing 361, a first packing installation groove 363 may be disposed. The first packing installation groove 363 may be formed in at least one of the flange supporter 348 or the housing flange 654. In this embodiment, the first packing installation groove 363 may be formed at the undersurface of the housing flange 654. The first packing installation groove 363 may form a closed curve around the base insertion hole 349.

The first packing installation groove 363 may be formed concave upwardly. When the flange supporter 384 closely contacts the housing flange 654, sealing is implemented as the first packing 361 closely contacts it.

Moreover, a packing 365 may be installed between the housing flange 654 and the water tank body 320. The packing 365 may be disposed at the upper side of the housing flange 654. The packing 365 may seal the water tank body insertion hole 329. The packing 365 may form a closed curve along the water tank body insertion hole 329.

In this embodiment, the packing 365 may be disposed at the lower side of the water tank body 320, and closely contact between the bearing housing 650 and the water tank body 320 during the fastening of the first fastening member 651. The packing 365 may be disposed at the inside compared to the first fastening member 651 or the body fastening part 321.

Also, in order to install the second packing 362, a second packing installation groove 364 may be disposed.

The second packing installation groove 364 may be disposed in at least one of the water tank body 320 and the water tank base 340. In this embodiment, it may be formed at the upper surface of the water tank base 340. The second packing installation groove 364 may be formed concave downwardly.

The second packing installation groove 364 may form a closed curve along the edge of the water tank base 340. The second packing installation groove 364 may be formed by a rib 367 protruding upwardly from the upper surface of the water tank base 340.

In this embodiment, the second packing installation groove 364 may be located at the upper side of the base enhancement rib 355. The second packing installation groove 364 may be disposed at the upper side of the groove 356 where the base enhancement rib 355 is disposed.

That is, the groove 356 and the second packing installation groove 364 for the base enhancement rib 355 may be disposed vertically and through this, the second packing installation groove 364 may enhance the strength.

The second packing installation groove 364 may be formed as avoiding the lower end 331 of the floater housing 330. The lower end 331 of the floater housing 330 may be located outside the packing installation groove 364.

Moreover, a window module 390 may be installed at the undersurface of the water tank 300 to transmit light. The window module 390 may transmit ultraviolet rays.

A body opening part 326 may be formed at the water tank body 320. A base opening part 346 may be formed in the water tank base 340. The base opening part 346 may be located at the lower side of the body opening part 326. The body opening part 326 and the base opening part 346 may be disposed in a vertical direction.

The window module 390 may be disposed between the water tank body 320 and the water tank base 340. The window module 390 may closely contact between the water tank body 320 and the water tank base 340.

In this embodiment, the window module 390 may be fastened to the undersurface of the water tank body 320 and seal the body opening part 326.

In relation to the window module 390, an ultraviolet module 290 for providing ultraviolet rays may be disposed at the upper body 120. Ultraviolet rays generated from the ultraviolet module 190 may penetrate the window module 390 to be projected into the water tank 300. The water stored in the water tank 300 may be sterilized through the ultraviolet rays.

Then the flow guide 310 formed at the undersurface of the water tank 300 will be described.

The flow guide 310 for guiding the stored water to the watering housing 80 may be disposed at the undersurface of the water tank 300. The flow guide 310 may be formed integrally with the water tank 300. In this embodiment, the flow guide 310 may be formed integrally with the water tank body 320. The flow guide 310 may be formed protruding upwardly from the undersurface of the water tank body 320.

The case that the water stored in the water tank 300 may be defined as empty water. The empty water may be greater than the minimum amount for spraying water through the watering housing 800.

The empty water may be a height from the inner undersurface of the water tank 300.

When the watering housing 800 stops, the height of stored water may be an amount for spraying water through a nozzle 410 but after the watering housing 800 rotates, the water height may be lower than the suction interval 801.

This is because that the central water moves toward the inner sidewall of the water tank 300 by the rotation of the watering housing 800. The flow guide 310 may be for suppressing such a water concentration.

When water stored in the water tank 300 is empty, the flow guide 310 may improve the drawing efficiency of the water housing 800. The flow guide 310 may provide a flow in a rising direction with respect to the water rotating inside the water tank 300. Additionally, the flow guide 310 may guide water rotating in the water tank 300 toward the watering housing 800.

The flow guide 310 may guide water flowing along the inner side of the water tank 300 toward the center where the watering housing 800 is located. The flow guide 310 may form a minimum separation distance (for example, 5 mm) to the watering housing 800. The flow guide 310 may provide effects such as empty water efficiency improvement, nose reduction, and vibration reduction.

The flow guide 310 may be spaced a predetermined interval away from the inner wall of the water tank body 320.

When the water of the water tank 300 rotates by the watering housing 800, the flow velocity of the water rotating in a close distance to the watering housing 800 may be different from the flow velocity of the water rotating along the inner wall of the water body 320.

The flow guide 310 may allow a flow velocity in the water tank 300 to be uniform. For this, when seen on a plane, an angle between the length direction of the flow guide 310 and the outer side surface of the watering housing 800 may be formed within 90 degrees.

The flow guide 310 may include a first inclination surface 312 and a second inclination surface 314.

The first inclination surface 312 may be formed toward the flow direction of water. Rotating water may be received through the first inclination surface 312. Water rotating along the first inclination surface 312 may be railed upwardly. The first inclination surface 312 may guide water rotating along the inner edge of the water tank 300 toward the watering housing 800.

The second inclination surface 314 may be formed opposite to the first inclination surface 314. A boundary 315 where water overflows may be formed between the first inclination surface 312 and the second inclination surface 314. When seen on a plane, in this embodiment, the boundary 315 may be disposed in a tangential direction with respect to the surface of the watering housing 800.

The flow guide 310 may provide an effect with only one. In this embodiment, the flow guide 310 may be disposed in two.

Then, a watering unit 400 disposed inside the water tank 300 will be described.

The watering unit 400 may rotate the watering housing 800 disposed inside the water tank 300 and spay water stored inside the water tank 300 to the inner side surface of the visual body 210 through the rotation of the watering housing 800.

The watering unit 400 may provide a structure for rotating the watering housing 800. The watering unit 400 may provide a power transmission module 600 for delivering power to the watering housing 800 in a separable structure of the water tank 300 and the upper body 120.

A structure of the watering unit 400 will be described in more detail as follows.

The watering unit 400 may include the watering housing 800, a watering motor 42, and the power transmission module 600.

The power transmission module 600 may include a watering housing 800 disposed inside the water tank 300, drawing the water of the water tank as rotating, pumping the drawn water upwardly, and discharging the pumped water to the outside, a watering motor 42 for providing a torque to the watering housing 800, and a power transmission module 600 for delivering a torque of the watering motor 42 to the watering housing 800.

After pumping the water stored in the water tank 300 upwardly, the watering housing 800 may have a configuration for spraying the pumped water to the outside in a radial direction.

The watering motor 42 may have a configuration for providing a torque for rotating the watering housing 800.

The power transmission module 600 may have a configuration for transmitting a torque of the watering motor 42 to the watering housing 800.

The watering housing 800, the watering motor 42, and the power transmission module 600 may be all installed at the water tank 300. In this case, a user may be required to lift the watering motor 42 when separating the air wash module 200. Additionally, in a case that even the watering motor 42 is assembled to the air wash module 200, if the air wash module 200 is required to be separated from the air clean module 200, the power supply structure of the watering motor 42 should be separable.

Therefore, this embodiment may suggest a structure where the heavy watering motor 42 is disposed at the upper body 120 and only the watering housing 800 and the power transmission module 600 are separated. A structure as in this embodiment may minimize the weight of the separable air wash module 200.

In this embodiment, the watering housing 800 and the watering motor 42 may be separable. The watering housing 800 may be installed inside the air wash module 200, and the watering motor 42 may be installed inside the air clean module 100. When the air wash module 200 is separated, the watering housing 800 may be separated from the air clean module 100 together with the water tank 300.

In order for a separation structure of the watering housing 800 and the watering motor 42, in this embodiment, the power transmission module 500 may be designed to be separable.

Figure 16:
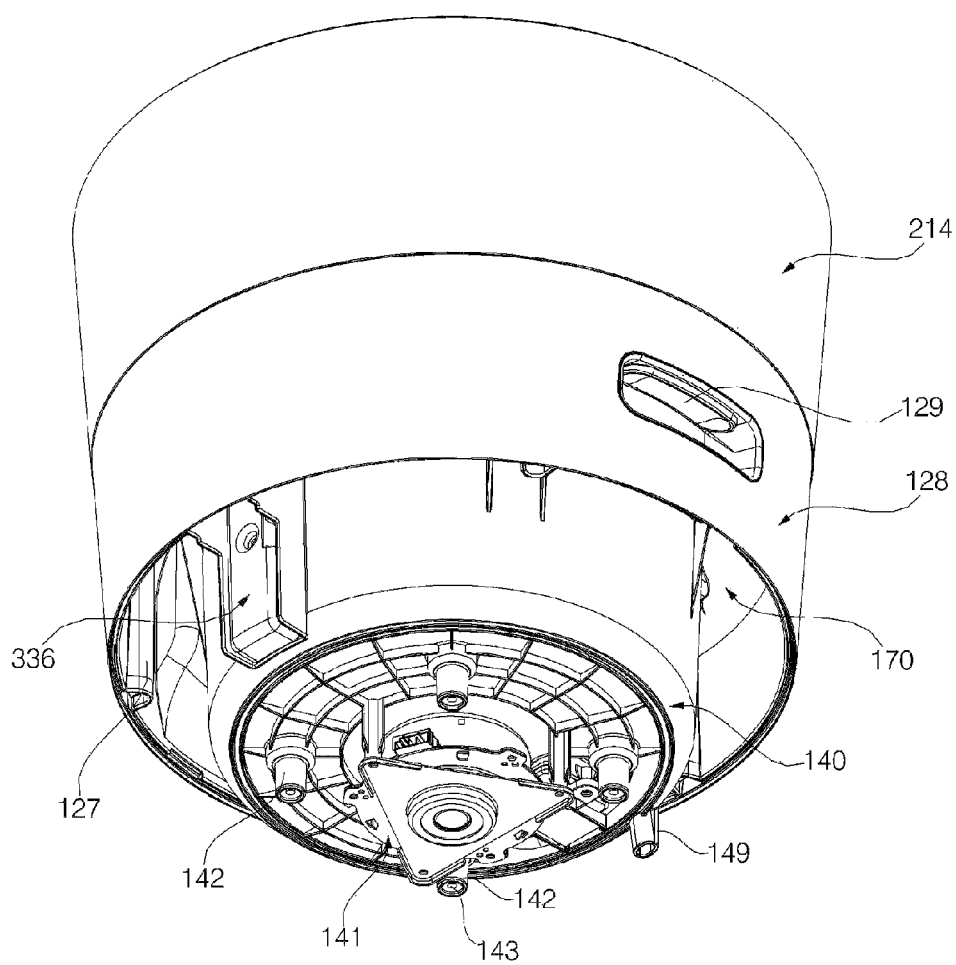
FIG. 16 is a perspective view of an upper body lower side of FIG. 2.
Figure 17:
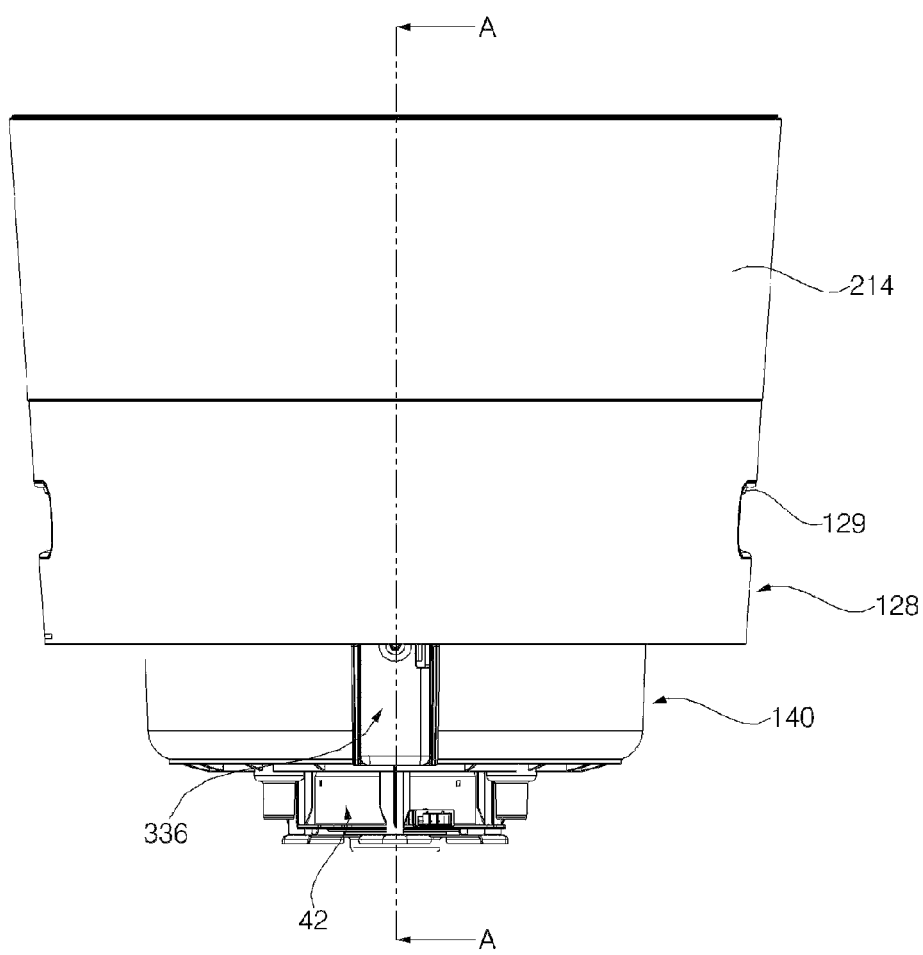
FIG. 17 is a front view of FIG. 16.
Figure 18:
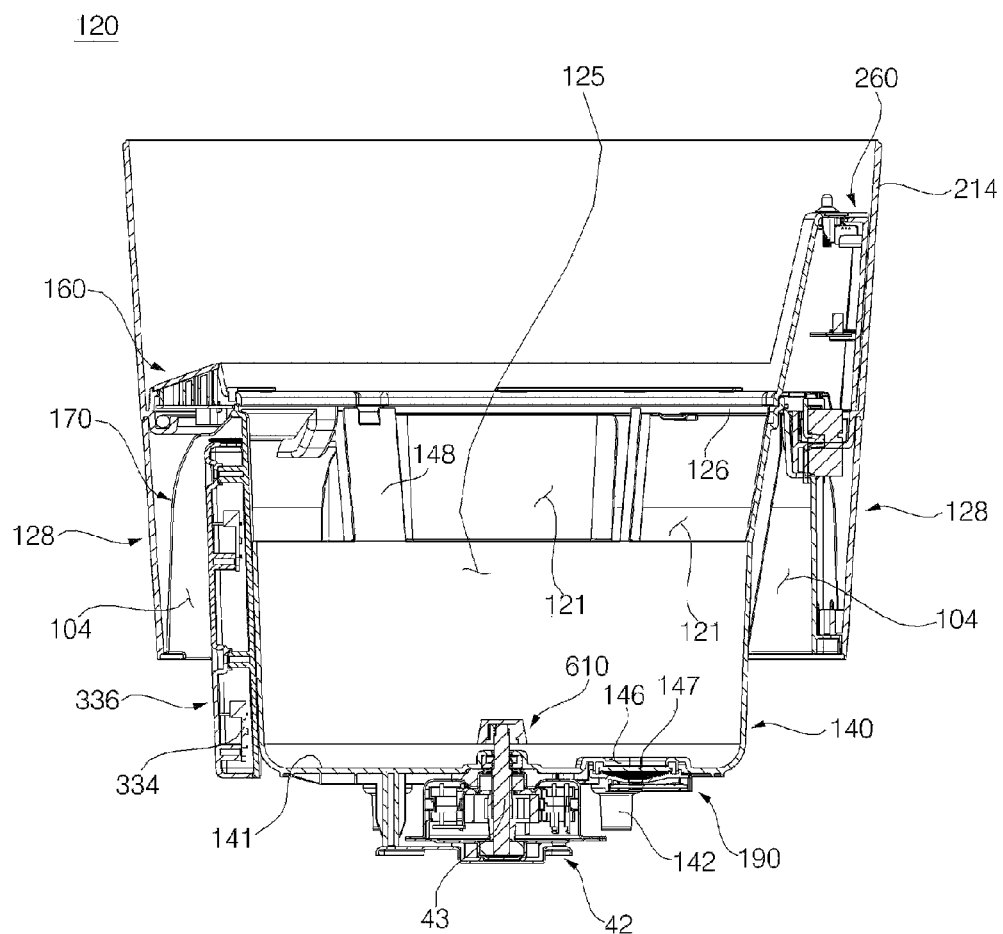
FIG. 18 is a cross-sectional view taken along a line A-A of FIG. 17.
Figure 19:
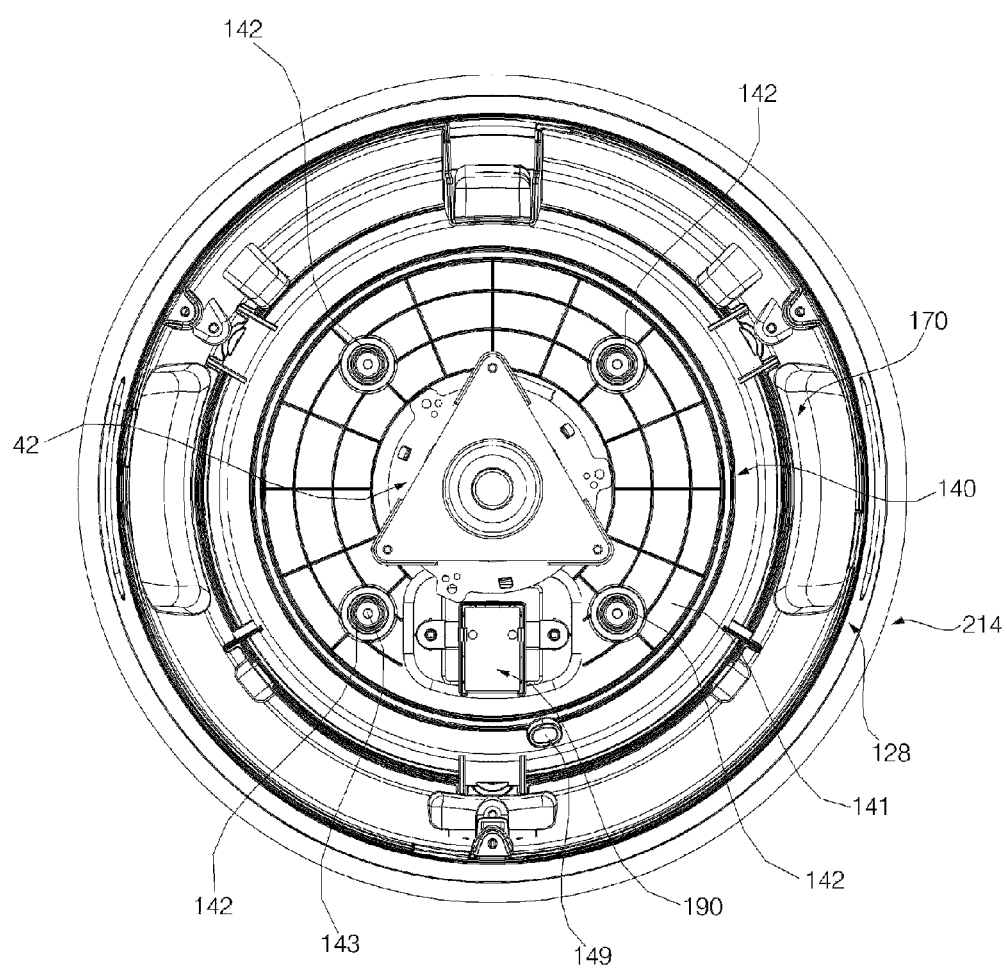
FIG. 19 is a bottom view of FIG. 16.
Figure 20:
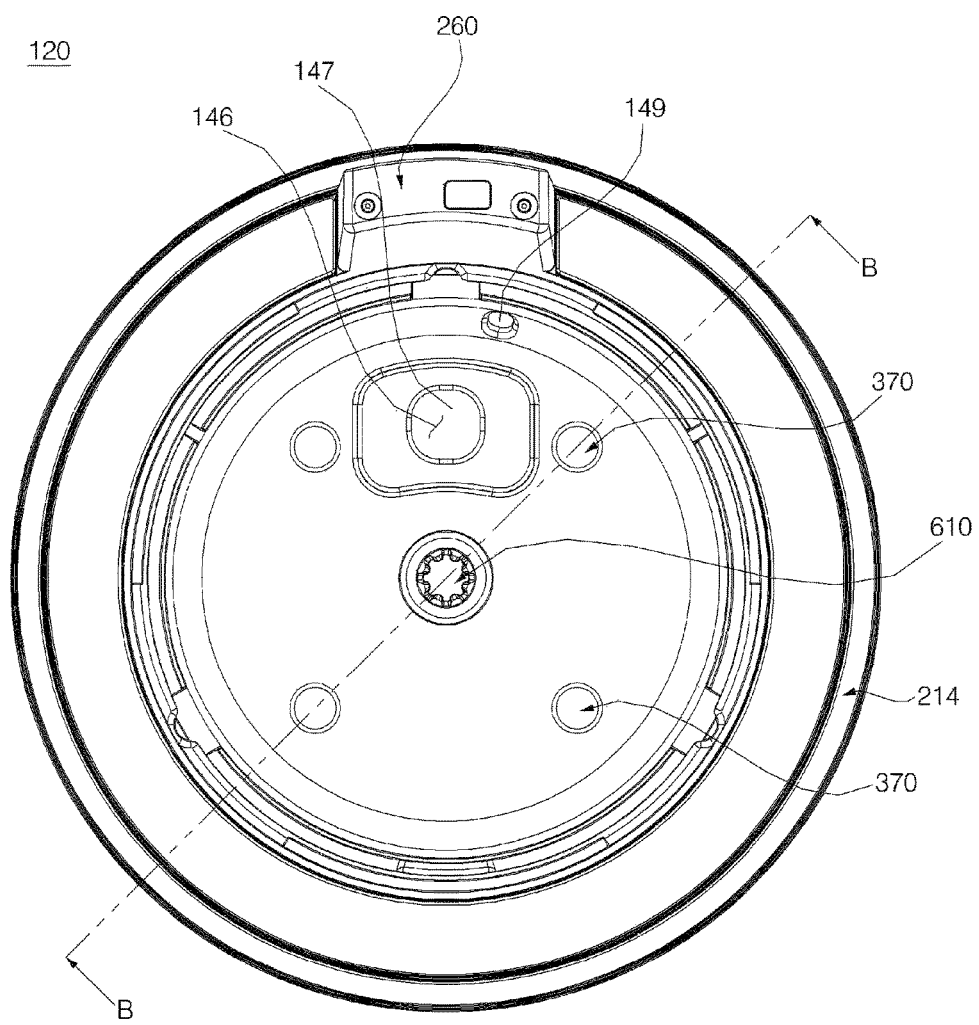
FIG. 20 is a plan view of FIG. 16.
Figure 21:
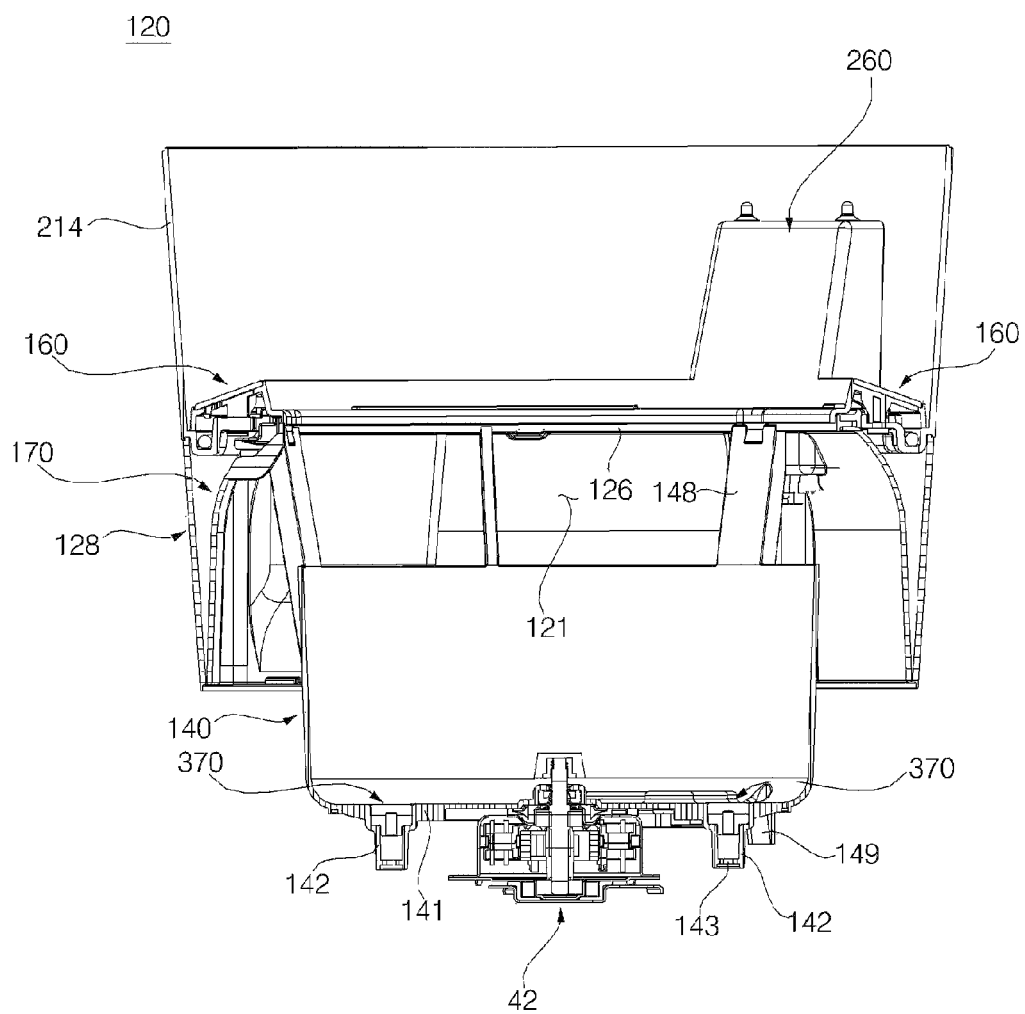
FIG. 21 is a cross-sectional view taken along a line B-B of FIG. 20.

FIG. 16 is a perspective view of an upper body lower side of FIG. 2. FIG. 17 is a front view of FIG. 16. FIG. 18 is a cross-sectional view taken along a line A-A of FIG. 17. FIG. 19 is a bottom view of FIG. 16. FIG. 20 is a plan view of FIG. 16. FIG. 21 is a cross-sectional view taken along a line B-B of FIG. 20.

The upper body 120 may configured the upper part of the base body 110 and the water tank 300 may be mounted thereon. The water tank 300 may be inserted into the upper body 120.

The upper body 120 may support the load of the air wash module 100. Especially, the water tank 300 may be mounted on the upper body 120 and the water tank 300 and the upper body 120 may contact each other.

A vibration insulation member 370 may be disposed between the water tank 300 and the upper body 120. The vibration insulation member 370 may separate the water tank 300 and the upper body 120 by a predetermined interval, and vibration-isolate the water tank 300 and the upper body 120.

That is, the vibration insulation member 370 may prevent vibration between the water tank 300 and the upper body 120. The vibration insulation member 370 may separate the water tank 300 and the upper body 120 by a predetermined interval.

The vibration insulation member 370 may be formed of an elastic material. The vibration insulation member 370 may be disposed on at least one of the water tank 300 and the upper body 120.

In this embodiment, the vibration insulation member 370 may be disposed at the upper body 120 and support the water tank 300.

The vibration insulation member 370 may be disposed inside the upper body 120 and protrude a predetermined height from the bottom of the upper body 120. The vibration insulation member 370 may support the load of the air wash module 200 including the water tank 300.

The vibration insulation member 370 may prevent the vibration of the air clean module 100 from being delivered to the air wash module 200. The vibration insulation member 370 may prevent the vibration of the blower fan 24, the blower motor 22, and the watering motor 42, disposed at the air clean module 100, from being delivered to the air wash module 200.

Additionally, the vibration insulation member 370 may prevent the vibration of the watering unit 400 of the air wash module 200 from being delivered to the upper body 120.

Trough the vibration isolation of the vibration insulation member 370, vibration may be prevented from being delivered and vibration noise may be reduced.

Additionally, trough the vibration isolation of the vibration insulation member 370, resonance occurrence may be greatly reduced.

Hereinafter, a structure of the upper body 120 will be described in more detail.

The upper body 120 may include an upper outer body 128 forming the exterior of the base body and coupled to the lower body 130, an upper inner body 140 disposed inside the upper outer body 128, having the water tank 300 inserted therein, and providing the connection flow passage 103, and an air guide 170 coupling the upper inner body 140 and the upper outer body 128 and guiding air to the water tank 300.

The upper inner body 140 may be formed to be opened at the upper side thereof, and may receive the water tank 300. The upper inner body 140 may form a portion of the clean connection flow passage 104 into which filtered air flows.

The upper inner body 140 may have an upper inlet 121 formed therein and corresponding to a water tank inlet 31. The upper inlet 121 may not be an essential component. It may be sufficient if the upper body 120 has a shape that exposes the water tank inlet 31 to the connection flow passage 103.

The air guide 170 may guide air supplied through the clean connection flow passage 104 to the upper inlet 121. The air guide 170 may collect air rising along the outside of the base body 110 toward the inside. The air guide 170 may change the flowing direction of air flowing from the lower side to the upper side. However, the air guide 170 may minimize the flow resistance of air by minimizing the change angle of the flow direction of air.

Accordingly, the air guide 170 may include a guide part 172 formed in the flowing direction of air, and a change part 174 that is connected to the guide part 172 and changes the flow direction of guided air.

The air guide 170 may form the connection flow passage 103.

The guide part 172 may be formed in the substantially same direction as the filtering flow passage 102, and in this embodiment, may be formed in a vertical direction. The change part 174 may be formed in a direction crossing the filtering flow passage 102, and in this embodiment, may be formed in a substantially horizontal direction.

The change part 174 may be disposed at an upper side of the air guide 170. The change part 174 may be connected to the guide part 172 through a curved surface.

Although the change part 174 is formed in a horizontal direction, air passing the connection flow passage 103 may upwardly flow in a substantially oblique direction. The flow resistance of air can be reduced by forming an angle between the connection flow passage 103 and the filtering flow passage 102 to be close to 180 degrees.

The lower end of the guide part 172 may be fixed to the upper outer body 128. The upper end of the change part 174 may be fixed to the upper inner body 140.

A portion of the clean connection flow passage 104 may be formed outside the upper inner body 140. The air guide 170 may form a portion of the clean connection flow passage 104. Air passing the clean connection flow passage 104 may flow into the water tank 300 through the upper inlet 121 and the water tank inlet 31.

The upper inner body 140 may have a basket shape on the whole. The upper inner body 140 may have a circular shape in horizontal section, and the clean connection flow passage 104 may be formed in all directions of 360 degrees of a circumference of the upper inner body 140.

The upper inner body 140 may have the inside in a concave form and surround the outside of the water tank 300. The vibration insulation member 370 may be disposed at the bottom 141 of the upper inner body 140.

The vibration insulation member 370 may protrude a predetermined height from the bottom 141 of the upper inner body 120. The vibration insulation member 370 may be formed of a different material than the upper inner body 140.

The upper inner body 140 may have an insertion groove 142 where the vibration insulation member 370 is inserted.

The insertion groove 142 may be disposed outside a first coupler 610. The insertion groove 142 may be disposed in plurality. The insertion groove 142 may be disposed in a circumferential direction on the basis of the watering motor axis 43. The insertion groove 142 may be disposed symmetrically on the basis of the watering motor axis 43. The insertion groove 142 may be formed protruding downwardly from the bottom 141. The insertion groove 142 may be formed concave downwardly from the upper side.

Moreover, a fastening member 147 for fixedly fastening the upper body 120 and the lower body 130 may be disposed and the fastening member 147 may be installed at the insertion groove 142.

The lower end of the insertion groove 142 may be supported by a structure of the lower body 130. The fastening member may penetrate the lower end of the insertion groove 142 to be fastened to the lower body 130.

A hole 143 that the fastening member penetrates may be formed at the lower end of the insertion groove 142. After inserted into the insertion groove 142 at the upper side, the fastening member may be fastened to the lower body 130.

After the fastening member 147 is fastened, the vibration insulation member 370 may be insertingly installed to the insertion groove 142. The vibration insulation member 370 may seal the insertion groove 142. The exposure of the fastening member may be prevented by sealing the insertion groove 142 and the fastening member may be prevented from being exposed to water.

When the water of the water tank 300 overflows, the water may be stagnated at the bottom of the upper inner body 140, and when the fastening member 147 is exposed to the stagnated water, corrosion may occur.

Additionally, when water is stagnated in a water tank insertion space 125, water may be leaked into the lower body 130 through the hole 143 of the insertion groove 142. Since a plurality of electrical components are inside the lower body 130, flowing water may be prevented.

Sealing an installation structure of the fastening member 147 may be very important due to the above reason. In this embodiment, through the vibration insulation member 370, the air wash module 200 and the air clean module 100 may be vibration-insulated and also a coupling structure of the upper body 120 and the lower body 130 may be sealed.

A drainage part 149 for draining the water stagnated in the inside to the outside may be formed at the bottom 141 of the upper inner body 140. The drainage part 149 may be formed protruding downwardly from the bottom 141 and a flow passage where water flows may be formed therein.

Reinforcing ribs like those formed at the bottom 301 of the water tank body 320 may be formed at the bottom 141 of the upper inner body 140. A reinforcing rib formed at the upper inner body 140 is identical to the above and thus, its description will be omitted.

An ultraviolet module 290 for providing ultraviolet rays may be installed at the bottom of the upper inner body 140. An upper opening part 146 may be formed at the bottom 141 of the upper inner body 140.

The upper opening part 146 may be formed open in a vertical direction. A window 147 of a material for transmitting ultraviolet rays may be disposed at the upper opening part 146.

The upper opening part 146 may be disposed at the lower side of the body opening part 326 and the base opening part 346 of the water tank 300. The ultraviolet module 190 may be disposed at the lower side of the window 147. The ultraviolet rays generated from the ultraviolet module 190 may penetrate the window 147 and the window module 390 to be projected into the water tank inside.

The watering motor 42 may be installed at the lower side of the upper inner body 140 and the watering motor axis 43 may penetrate the bottom 141 of the upper inner body 140 to protrude upwardly. The first coupler 610 may be disposed at the upper end of the watering motor axis 43. The first coupler 610 may be disposed inside the upper inner body 140 and formed protruding upwardly from the bottom 141.

The sensor housing 336 where the magnetic sensor 334 is installed may be disposed at a side part of the upper inner body 140. The sensor housing 336 may installed as closely contacting the outer side surface of the upper inner body 140. The sensor housing 336 may be formed extending long in a vertical direction in order to detect a water level of the water tank 300. A magnetic sensor 334 may be disposed inside the sensor housing 336. The sensor housing 336 may be located inside the air guide 170 and disposed at a clean connection flow passage 104.

The air guide 170 may be a component for guiding filtered air to the clean connection flow passage 104, and may be omitted in accordance with embodiments. The air guide 170 may combine the upper inner body 140 or the upper outer body 128.

The air guide 170 may be formed to cover the upper inner body 140. Particularly, the air guide 170 may be formed to cover the upper inlet 121, and may guide filtered air to the upper inlet 121. When viewed from top, the air guide 170 may have a donut shape.

In this embodiment, the upper end of the air guide 170 may adhere closely to the upper end of the upper inner body 140.

When viewed from top, the upper side surface of the air guide 170 may coincide with the upper side surface of the upper inner body 140. In this embodiment, an upper inner body ring 126 may be disposed on the upper end of the upper inner body 140 to be coupled to or adhere closely to the air guide 170.

An inner body extension part 148 may be disposed to connect the upper inner body 140 and the upper inner body ring 126. The inner body extension part 148 may be disposed in plurality. An upper inlet 121 may be formed between the inner body extension part 148 and the upper inner body ring 126.

The inner body extension part 148 may correspond to a water tank body extension part 380. When the water tank 300 is placed, the water tank body extension part 380 may be located inside the inner body extension part 148. The inner body extension part 148 and the water tank body extension part 380 may overlap each other inside and outside.

The upper end of the air guide 170 may adhere closely to or be coupled to the upper inner body ring 126. The lower end of the air guide 170 may adhere closely to or be coupled to the upper outer body 128.

Accordingly, air flowing through the clean connection flow passage 104 between the upper inner body 140 and the upper outer body 128 may be guided to the upper inlet 121.

The diameter of the upper inner body ring 126 and the diameter of the upper end of the air guide 170 may be the same as or similar to each other. The air guide 170 and the upper inner body ring may adhere closely to each other to prevent leakage of filtered air. The upper inner body ring 126 may be disposed inside the air guide 170.

A grip 129 may be formed on the upper outer body 128. The air wash module 200 may be placed in the upper body, and the whole of the humidification and air cleaning apparatus can be lifted through the grip 129.

The upper inner body 140 may have the water tank insertion space 125 formed therein so as to receive the water tank 300.

The clean connection flow passage 104 may communicate with the inside of the water tank 300. In this embodiment, the humidification medium 50 may be disposed inside the clean connection flow passage 104.

A watering motor 42 of the watering unit 40 described later may be installed at the upper body 120. The watering motor 42 may be physically separated from the blower motor 22.

The watering motor 42 may be fixed at the outside of the upper inner body 140 through a watering bracket 126. In this embodiment, the watering motor 42 may be fixed at the undersurface of the upper inner body 140. In this embodiment, the driving force of the watering motor 42 may penetrate the upper inner body 140 to be delivered to the inside of the water tank 300.

In this embodiment, the watering motor 42 and the blower motor 22 may be separately installed to different structures and through this, vibration may be prevented. In this embodiment, the watering motor 42 may be installed at an upper body 120 and the blower motor 22 may be installed at a blower housing 150. Through this, when two motors 22 and 42 operate at the same time, resonance and vibration may be minimized. The blower motor 22 and the watering motor 42 may be controlled separately.

Meanwhile, an outer visual body 214 may be coupled to the upper side of the upper body 120.

The outer visual body 214 may be a component of the visual body 210, but in this embodiment, may be fixed to the upper body 120. Unlike this embodiment, the outer visual body 214 may also be fixed to the air wash module 200. Unlike this embodiment, the outer visual body 214 may be omitted.

The outer visual body 214 may be fixed to the upper body 120. In this embodiment, the outer visual body 214 may be coupled to the upper outer body 128. The outer visual body 214 and the outer surface of the upper outer body 128 may form a continuous surface.

The outer visual body 214 may be formed of a material through which a user can see the inside of the outer visual body 214. The outer visual body 214 may be formed of a transparent or translucent material.

The display module 160 may be disposed inside the outer visual body 214. The display module 160 may be disposed to adhere closely to the inner side surface of the outer visual body 214. When viewed from top, the display module 160 may have a donut shape. The water tank 300 may be inserted into the display module 160.

The display module 160 may be supported by the outer visual body 214. The inner edge of the display module 160 may be supported by the upper inner body ring 126. The display module 160 may be disposed over the air guide 170. The display module 160 may be manufactured integrally with a connector 260.

The display module 160 may be disposed over the air guide 170. The display module 160 may be disposed between the upper outer body 128 and the upper inner body 140. The display module 160 may cover the upper outer body 128 and the upper inner body 140 such that a user cannot see a gap between the upper outer body 128 and the upper inner body 140. The inside and the outside of the display module 160 may be sealed to prevent water from permeating between the upper outer body 128 and the upper inner body 140.

The inside of the display module 160 may be supported by the upper inner body 140, and the outside of the display module 160 may be supported by the outer visual body 218.

In this embodiment, the display 160 may have a ring shape. Unlike this embodiment, the display 160 may be formed into an arc shape. The display 160 may include a display PCB 162 and a display housing 164. The display housing 164 may be formed of a material that reflects light and coated with a material that reflects light.

Accordingly, when water drops are formed on the visual body 210, water drops formed on the visual body 210 may be projected onto or reflected by the surface of the display housing 164. When the water drops formed on visual body 210 flows down, the same effect is also shown on the display housing 164.

This effect may give a visual stimulus to a user, and a user may intuitively recognize that humidification is being performed. The water drop image projected on the display housing 164 may give a refreshment feeling to a user, and may allow a user to know the humidification state.

The upper side surface of the display housing 164 may be obliquely formed. The display housing 164 may be obliquely disposed toward a user. Accordingly, the inside of the display 160 may be high, and the outside thereof may be low.

Figure 22:
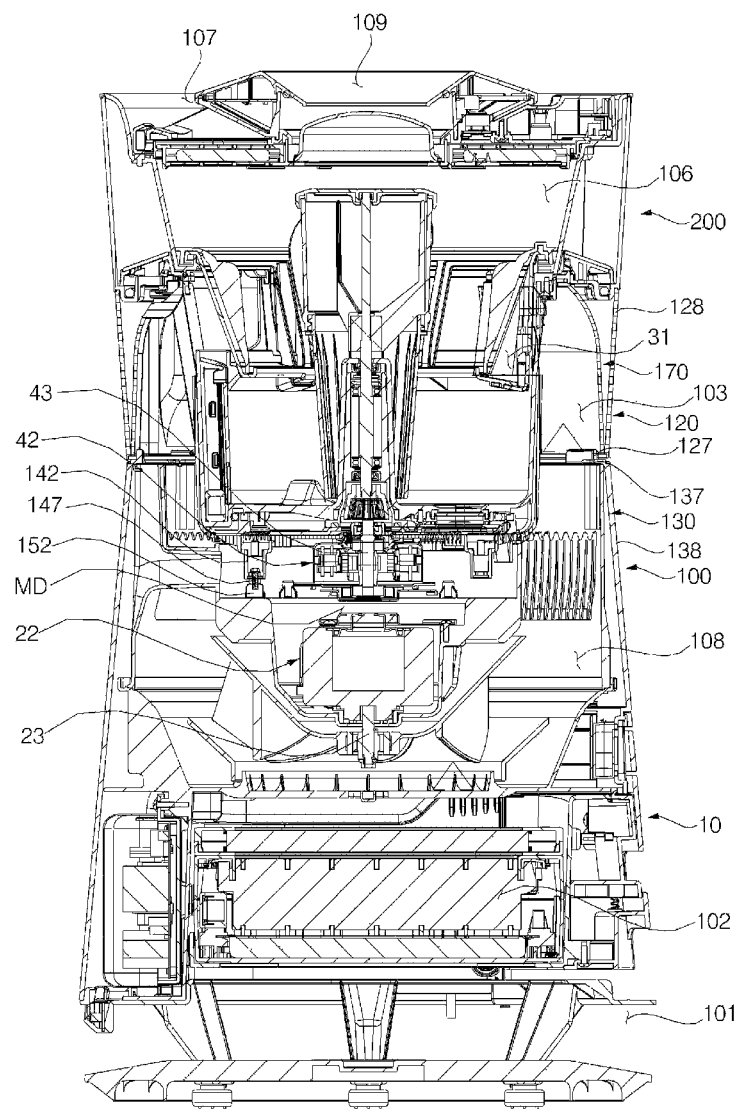
FIG. 22 is a cross-sectional view of FIG. 1.
Figure 23:
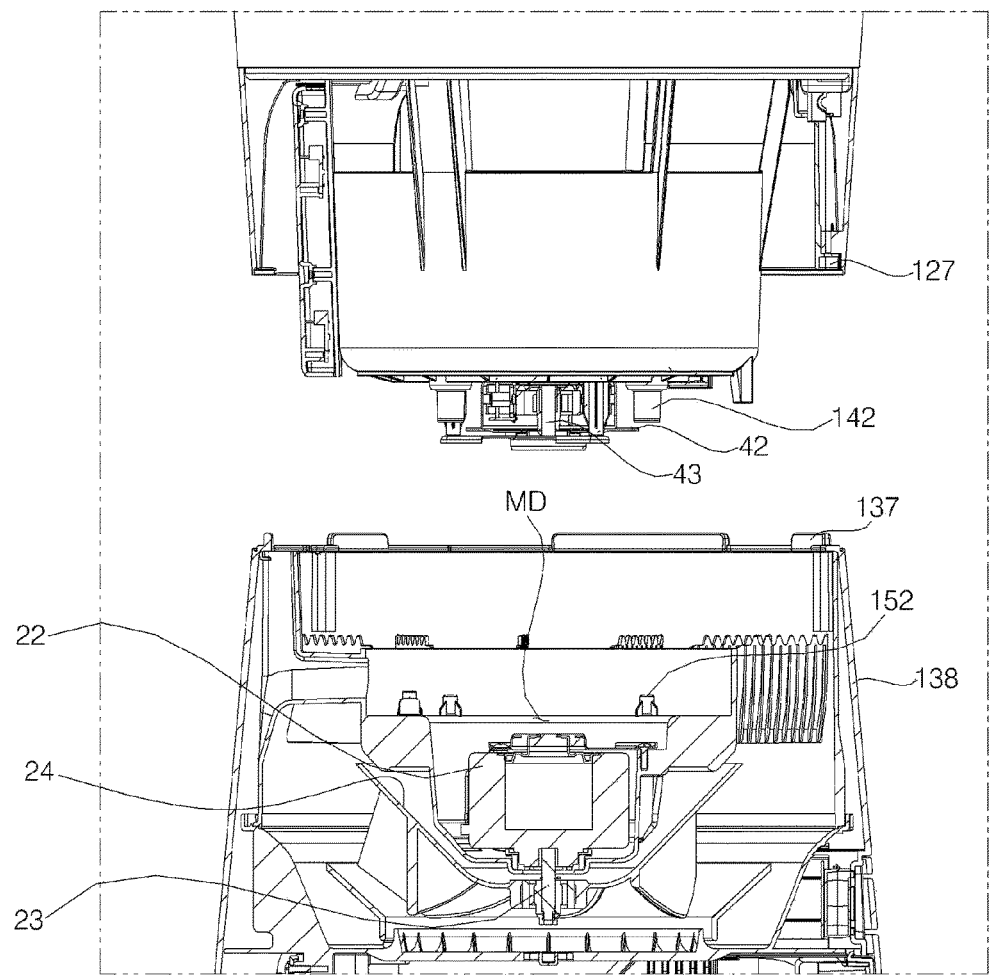
FIG. 23 is an exploded cross-sectional view when a watering motor and a blower motor are separated.
Figure 24:
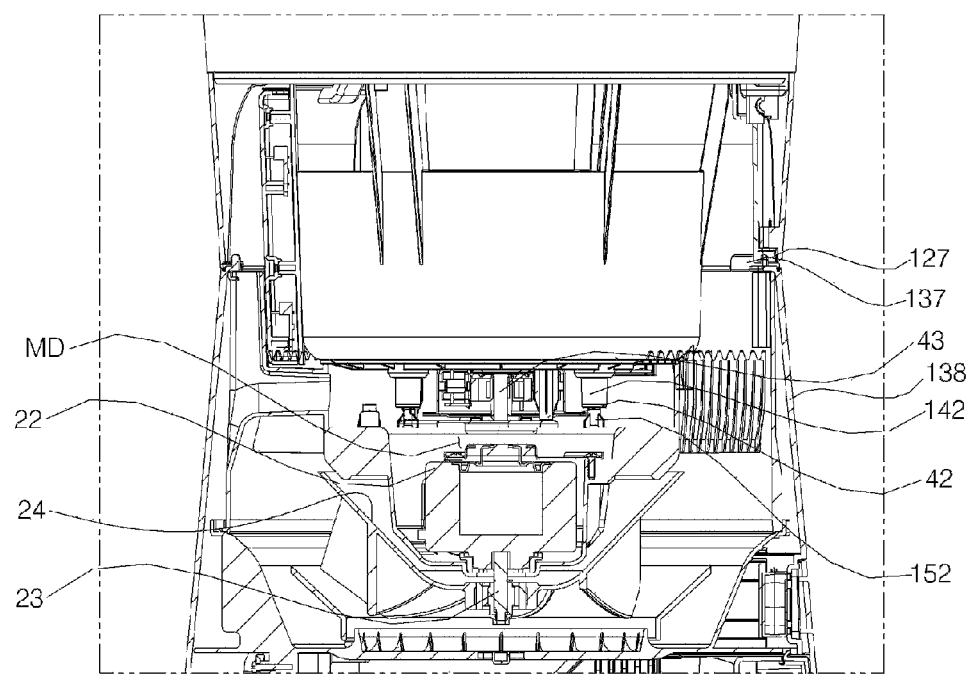
FIG. 24 is a cross-sectional view when a watering motor and a blower motor are coupled.

FIG. 22 is a cross-sectional view of FIG. 1. FIG. 23 is an exploded cross-sectional view when a watering motor and a blower motor are separated. FIG. 24 is a cross-sectional view when a watering motor and a blower motor are coupled.

Referring to the drawing, a coupling relationship and arrangement of an upper body and a lower body will be described in more detail.

A lower body 130 may include a lower outer body 138 for forming the appearance of a base body 110 and a blower fan housing 150 disposed inside the lower outer body 138.

The blower fan housing 150 may be disposed inside the lower outer body 138 and coupled to the lower outer body 138.

The upper body 120 may include an upper outer body 128 forming the appearance of the base body 110 and coupled with the lower outer body 138 and an upper inner body 140 disposed inside the upper outer body 128, including the water tank 300 inserted, and providing a connection flow passage 103.

Herein, the upper outer body 128 and the lower outer body 138 may be fastened to each other. The upper inner body 140 may be fastened to the blower fan housing 150. In the fastening state, the watering motor 42 and the blower motor 22 may form a motor separation distance MD.

In order for the fastening of the upper outer body 128 and the lower outer body 138, a fastening part 127 may be disposed at the upper outer body 128 and a fastening part 137 may be disposed at the lower outer body 138. Through the fastening parts 127 and 137, the load may be supported.

In order for the fastening of the upper inner body 140 and the blower fan housing 150, an insertion groove 142 may be formed at the upper inner body 140 and a fastening part 152 may be disposed at the blower fan housing 150.

Through the insertion groove 142 and the fastening part 152, the load may be supported.

The watering motor 42 may be installed at the upper inner body 140 and the blower motor 22 may be installed at the blower fan housing 150.

Since the blower motor 22 and the watering motor 42 are disposed spaced from each other, vibration may not be directly delivered. Since the blower motor 22 and the watering motor 42 are disposed spaced from each other, resonance occurrence may be minimized.

The vibration generated from the blower motor 22 may be delivered to the watering motor 42 only when going through the blower fan housing 150, the lower outer body 138, the upper outer body 128, and the upper inner body 140.

On the other hand, the vibration generated from the watering motor 42 may be delivered to the blower motor 22 only when passing through the upper inner body 140, the upper outer body 128, the lower outer body 138, and the blower fan housing 150.

During the process of undergoing a plurality of structures, vibration may be reduced and buffered.

Especially, a structure for suppressing vibration in such a manner may minimize the vibration delivered to the water tank 300 mounted in the water tank insertion space 300.

A humidification and air cleaning apparatus according to an exemplary embodiment of the present invention has at least one of the following effects.

First, since two motors form a motor separation interval, vibration generated from one can be prevented from being directly delivered to the other.

Second, since the motor separation interval is formed, even when two motors operate at the same time, resonance occurrence can be prevented.

Third, since blower motor and a watering motor are stacked vertically inside a base body, eccentricity can be minimized.

Fourth, since a blower motor axis is installed downwardly and a watering motor axis is installed upwardly, space can be utilized efficiently.

Fifth, since a blower motor axis and a watering motor axis are disposed on the same line, even if two of them operate at the same time, eccentricity and vibration can be minimized.

The effects of the present invention are not limited to the above; other effects that are not described herein will be clearly understood by the persons skilled in the art from the following claims.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A humidification and air cleaning apparatus comprising:
    a base body comprising an upper body and a lower body coupled to a lower part of the upper body;
    a water tank disposed at the upper body to store water;
    a water housing disposed inside the water tank to spray water;
    a watering motor installed at the upper body to provide a torque to the watering housing; and
    a blower motor installed at the lower body,
    wherein the blower motor and the watering motor are disposed vertically inside the base body, and the watering motor and the blower motor are spaced apart from each other.

2. The humidification and air cleaning apparatus of claim 1, wherein the blower motor comprises a blower motor axis and the watering motor comprises a watering motor axis, and the blower motor axis and the watering motor axis are disposed vertically.

3. The humidification and air cleaning apparatus of claim 2, wherein the blower motor axis and the watering motor axis are disposed on the same straight line.

4. The humidification and air cleaning apparatus of claim 2, wherein the blower motor axis is disposed downwardly, and the watering motor axis is disposed upwardly.

5. The humidification and air cleaning apparatus of claim 2, further comprising:
    a first coupling coupled to the watering motor axis; and
    a second coupling coupled to the first coupling to receive a torque and coupled to the watering housing to deliver a torque.

6. The humidification and air cleaning apparatus of claim 5, wherein the water tank is separably coupled to the upper body, and the first coupling and the second coupling are coupled separably, and when the water tank is separated, the first coupling and the second coupling are separated.

7. The humidification and air cleaning apparatus of claim 2, wherein the upper body further comprises an upper inner body having a water tank insertion space and the watering motor is installed at the upper inner body.

8. The humidification and air cleaning apparatus of claim 7, wherein the watering motor is installed at an undersurface of the upper inner body and the watering motor is disposed to penetrate the undersurface of the upper inner body.

9. The humidification and air cleaning apparatus of claim 1, further comprises a blow fan to blow air,
wherein the lower body comprises a blower fan housing, and the blower motor is installed at the blower fan housing, and the blower fan is coupled to the blower motor axis.

10. The humidification and air cleaning apparatus of claim 9, wherein the blower fan is disposed at a lower side, and the blower motor is disposed at an upper side of the blower fan, and the blower motor axis extends downwardly to be coupled with the blower fan.

11. The humidification and air cleaning apparatus of claim 10, wherein the blower fan is disposed to surround the blower motor.

12. The humidification and air cleaning apparatus of claim 11, wherein the blower fan is a centrifugal fan to admit air from a lower side and then discharge air in a radial direction.

13. The humidification and air cleaning apparatus of claim 12, wherein the blower fan discharges the air to be inclined upwardly.

14. The humidification and air cleaning apparatus of claim 1, wherein the upper body further comprises:

an upper outer body forming an appearance of the base body and coupled to the lower body; and
an upper inner body disposed inside the upper outer body and coupled to the upper outer body,
wherein the lower further comprises:
a lower outer body forming an appearance of the base body and coupled to the upper outer body; and
a blower fan housing disposed inside the lower outer body and coupled to the lower outer body,
wherein the watering motor is installed at the upper inner body and the blower motor is installed at the blower fan housing.

15. The humidification and air cleaning apparatus of claim 14, wherein the lower outer body has an outside diameter that becomes smaller as it goes from a lower side to an upper side, and the upper outer body has an outside diameter that becomes smaller as it goes from an upper side to a lower side.

16. The humidification and air cleaning apparatus of claim 14, wherein the upper outer body and the lower outer body are coupled to be assembled.

17. The humidification and air cleaning apparatus of claim 14, wherein the upper inner body and the blower fan housing are coupled to be assembled.

18. The humidification and air cleaning apparatus of claim 14, wherein the upper outer body and the lower outer body are coupled to be assembled, and the upper inner body and the blower fan housing are coupled to be assembled, and the watering motor and the blower motor form a motor separation interval and are disposed vertically.

19. The humidification and air cleaning apparatus of claim 14, wherein the blower motor comprises a blower motor axis, and the watering motor comprises a watering motor axis, and the blower motor axis is installed downwardly, and the watering motor axis is installed upwardly.

\* \* \* \* \*